United States Patent [19]

Koh et al.

[11] Patent Number: 5,416,861
[45] Date of Patent: May 16, 1995

[54] OPTICAL SYNCHRONOUS CLOCK DISTRIBUTION NETWORK AND HIGH-SPEED SIGNAL DISTRIBUTION NETWORK

[75] Inventors: Seungug Koh, Cincinnati; Harold W. Carter, Maineville; Joseph T. Boyd, Cincinnati, all of Ohio

[73] Assignee: University of Cincinnati, Cincinnati, Ohio

[21] Appl. No.: 234,999

[22] Filed: Apr. 29, 1994

[51] Int. Cl.⁶ .......................... G02B 6/00; G02B 6/36
[52] U.S. Cl. ........................................ 385/14; 359/109
[58] Field of Search .................. 359/109, 114–119, 359/123, 124, 127, 128; 385/14, 16

[56] References Cited

U.S. PATENT DOCUMENTS

| | | | |
|---|---|---|---|
| 4,682,323 | 7/1987 | Corfield et al. | 359/139 |
| 4,871,224 | 10/1989 | Karstensen | 385/14 |
| 5,157,461 | 10/1992 | Page | 385/14 |
| 5,255,111 | 10/1993 | Kwa | 359/113 |
| 5,263,111 | 11/1993 | Nurse et al. | 385/130 |
| 5,276,745 | 1/1994 | Revelli, Jr. | 359/152 |

OTHER PUBLICATIONS

Ahmed El-Amawy, "Clocking Arbitrarily Large Computing Structures Under Constant Skew Bound," *IEEE Transactions on Parallel and Distributed Systems*, vol. 4, No. 3, pp. 241–255, Mar., 1993.

Gail R. Lalk et al., "Board Level High Speed Photonic Interconnections: Recent System Developments," *Optical Interconnects in the Computer Environment*, SPIE vol. 1178, pp. 123–130, 1989.

Davis H. Hartman, "Digital High Speed Interconnects: A Study of the Optical Alternative," *Optical Engineering*, vol. 25, No. 10, pp. 1086–1102, Oct., 1986.

Allan L. Fisher et al., "Synchronizing Large VLSI Processor Arrays," *IEEE Transactions on Computers*, vol. C-34, No. 8, pp. 734–740, Aug. 1985.

Morteza Afghahi et al., "Performance of Synchronous and Asynchronous Schemes for VLSI Systems," *IEEE Transactions on Computers*, vol. 41, No. 7, pp. 858–872, Jul., 1992.

Andrew Kahng et al., "High Performance Clock Routing Based on Recursive Geometric Matching," *28th ACM/IEEE Design Automation Conference®*, UCLA Department of Computer Science, Los Angeles, Calif., pp. 322–327.

Toshikazu Sakano et al., "Multiprocessor System using an Automatically Rearrangeable Free-Space Multi- (List continued on next page.)

*Primary Examiner*—Akm E. Ullah
*Attorney, Agent, or Firm*—Frost & Jacobs

[57] ABSTRACT

An optical waveguide H-tree design is provided for global clock distribution on multichip modules (MCM) which has nearly zero clock skew and is useful for a distributed computer system environment. The optical waveguide H-tree design utilizes channel waveguides, curved sections and directional couplers formed using silica glass and silicon oxynitride (SiON) channel waveguide technologies. A hybrid combination of both SiON and silica glass is disclosed which has the advantages of each. The achievable clock speed is limited by the laser diode source and photodiode receiver at each chip module, and not by the optical waveguide distribution network. The high-speed optical waveguide can be configured to transmit clock signals, or for use as a multi-wavelength communication network that communicates signals to various integrated circuits (ICs) mounted on the multichip module. This is achieved using multiple laser diodes having different output wavelengths and directing their outputs into an optical multiplexer. At the receiving points on the ICs, optical demultiplexers filter the optical signals into individual output signals. In addition, multiple "stacked" optical waveguides can be constructed on the MCM to transmit multiple optical signals, and such optical signals can be either of single wavelength or multiple wavelength type.

33 Claims, 11 Drawing Sheets

OTHER PUBLICATIONS channel Optical Switch: COSINE-2," *Applied Optics*, vol. 32, No. 20, pp. 3690–3699, Jul. 10, 1993.

Paola Cinato et al., "Optical Interconnections Within Multichip Modules," *Optical Engineering*, vol. 32, No. 4, pp. 852–860, Apr., 1993.

T. Tamir et al., "Analysis and Design of Grating Couplers," *Applied Physics*, Appl. Phys. 14:235–254 (1977), pp. 235–254.

J. W. Parker, "Espirt II Olives–A European Collaborative Programmed in Optical Interconnections," 1990 STC PLC, pp. 408–413.

Ren-Song Tsay, "An Exact Zero-Skew Clocking Routing Algorithm," *IEEE Transactions on Computer-Aided Design of Integrated Circuits and Systems*, vol. 12, No. 2, pp. 242–249, Feb., 1993.

Victor Mizrahi et al., "Ultraviolet Laser Fabrication of Ultrastrong Optical Fiber Gratings and of Germania-Doped Channel Waveguides," *Appl. Phys. Lett.*, vol. 63, No. 13, pp. 1727–1729, Sep. 27, 1993.

Meiliu Lu et al., "Analysis of Self-Stabilizing Clock Synchronization by Means of Stochastic Petri Nets," *IEEE Transactions on Computers*, vol. 39, No. 5, pp. 597–604, May, 1990.

Cheng-Sheng Li et al., "Fully Differential Optical Interconnections for High-Speed Digital Systems," *IEEE Transactions on Very Large Integration (VLSD Systems)*, vol. 1, No. 2, pp. 151–163, Jun., 1993.

K. W. Jelley et al., "High-Speed Chip-to-Chip Optical Interconnect," *IEEE Photonics Technology Letters*, vol. 4, No. 10, pp. 1157–1159, Oct., 1992.

S. K. Tewksbury et al., "Opportunities and Issues for Optical Interconnects in Microelectronic Systems," *Optoelectronics: Technologies and Applications*, Chapter 11, pp. 232–263, SPIE.

Pradeep Lall et al., "An overview of Multichip Modules," *Solid State Technology*, pp. 65–76, Sep., 1993.

K. H. Calhoun et al., "Vertical Optical Communication Through Stacked Silicon Wafers Using Hybrid Monolithic Thin Film InGaAsP Emitters and Detectors", *IEEE Photonics Technology Letters*, vol. 5, No. 2, pp. 254–257, Feb. 1993.

Chung-Sheng Li et al., "Differential Board/Backplane Optical Interconnects for High-Speed Digital Systems, Part I: Theory," *Journal of Lightwave Technology*, vol. 11, No. 7, pp. 1234–1249, Jul., 1993.

OPTICAL SYNCHRONOUS CLOCK DISTRIBUTION NETWORK AND HIGH-SPEED SIGNAL DISTRIBUTION NETWORK

TECHNICAL FIELD

The present invention relates generally to high-speed electronic systems and is particularly directed to multiple integrated circuit systems of the type which are mounted upon multichip modules. The invention is specifically disclosed as a high-speed, low-skew optical waveguide synchronous clock distribution network that has a large fanout capacity to drive multiple integrated circuits with a very low data error rate.

BACKGROUND OF THE INVENTION

The system clock distribution for contemporary computer systems faces difficult problems as the system size and integration density of the Integrated Circuits (ICs) increases as parallel multiprocessor computer architectures are employed along with the decreased minimum feature size in IC fabrication. It is known that using a synchronous system clocking scheme is most advantageous for the ease of design and performance improvement of the computer systems. However, it has been impossible to distribute the global system clock on the entire system or the subsystem of the computers when the fast clock signals (e.g., over 200 MHz) must be distributed over long interconnection distances and with a large fanout (e.g., over sixteen), and with small clock skew and rise time. Multichip Modules (MCMs) are well recognized as one way of solving signal interconnection problems by placing multiple bare dies directly into a module to eliminate the packaging overheads and reduce interconnection distances.

The system clock frequency of a computer system represents the rate of data processing for CPU or the rate of data transmission for I/O and memory. Thus increasing the system clock frequency directly enhances the throughput of the computer system. For this reason there has been extensive research efforts to achieve faster system clock frequencies using (1) faster logic families (i.e., CMOS<ECL<GaAs), (2) faster storage elements such as latches or flip-flops, (3) robust clocking schemes, and (4) equidistant clock distribution to minimize clock skew.

As faster silicon (Si) and gallium arsenide (GaAs) integrated circuits (ICs) are employed, along with parallel and interconnection-intensive processing architectures, signal interconnections between integrated circuit components become a performance-limiting factor of modern high-speed microprocessors. The signal interconnection problems become worse as computer systems evolve toward higher capacity multi-processing architectures such as high performance distributed multiprocessor computer systems (DMCS). As DMCS size grows, relative signal interconnection delays of DMCS become so large that signal interconnection becomes a major limitation of faster system throughput. This difficult signal interconnection issue of large DMCS makes "scalar" improvement of the computer system throughput nearly impossible as the system size grows with multiple processors.

Several methods have been recognized to resolve signal interconnection bottlenecks of DMCS such as efficient packaging, introduction of innovative technologies (optical or superconductor interconnections) into interconnection networks, and efficient system architectures with emphasis on reducing signal interconnection delays. Efficient packaging technologies such as multichip packaging (multichip modules or wafer scale integration) have been studied and implemented to reduce the electrical parasitic characteristics associated with individual chip packaging.

In MCMs, bare dies of ICs are directly mounted on a common module to reduce one level of packaging hierarchy and thereby enable overall computer size compactness. The inter-chip interconnection distances and chip packaging parasitics are reduced allowing better signal interconnection performance in multichip packaging. Innovative technologies such as optical interconnection and superconductivity wiring have the potential of greatly reducing the role of signal interconnection as a limiting factor in digital system speed in the future. The network bandwidth of these technologies are wide enough to meet computer systems signal interconnection requirements well into the future. In particular, optical interconnection methods can be a very feasible solution to the increased demand for computer speed once successful and reliable device fabrication and integration are realized.

A key signal interconnection required in synchronous digital systems is clock distribution. Clock signal behavior is more restrictive than general I/O signals due not only to high fanout, but also to the fast risetime and small skew required. System clocking provides the fundamental timing for the computer system. The clock frequency determines the rate of data processing for the CPU, access speeds for memory and rate of data transmission in I/O of subsystems. The computer system throughput is proportional to instruction and data transmission rates and these rates are linearly related to the clock frequency. Thus the computer system throughput becomes scalable as the system clock frequency increases.

Clock skew is formally defined as the time difference between the switching points on the rising edge of the clock waveform at different fanout nodes of the clock distribution network. This is normally caused by different interconnection distances and different electrical wire characteristics such as wire widths and thicknesses, materials or cross coupling noise with neighboring wires. The control of clock skew over the physical dimensions of a modern, large and high speed computer system is very difficult because high performance computer systems tend to have higher clock frequencies, larger chip sizes with long signal paths, larger RC delays with smaller feature sizes and unpredictable layout configurations for different ICs. An example of a low skew clock is one in which the skew is less than ten percent (10%) of the clock period.

Global clock signals are distributed at high frequencies by single source interconnects which operate as transmission lines. The global clock distribution system includes three major components; a clock driver, a distribution network and a clock receiver. The clock drivers can be either on-wafer or off-wafer drivers. The local clock lines on a MCM can be buffered to compensate fanout power limitations when active components are built on the MCM in addition to passive components like multilayer metal interconnections. However, controlling the multiple high-speed buffers at different MCM sites is hard to do for large MCM size and a large number of buffers. Different butter delays among local buffers could result in intolerable clock skews at the end of clock lines.

The electrical H-tree clock distribution configuration is well known in the VLSI design community as a way of eliminating clock skews by making the interconnection distances equal for all nodes from the clock generator. But the most elaborate H-tree electrical clock distribution on MCMs is still limited by driver capabilities and transmission line properties such as reflections, crosstalk, line resistances, line capacitances and characteristic impedances. The electrical system clock distribution on MCM is limited to less than or equal to sixteen (16) nodes depending on the clock frequencies (50 to 200 MHz). Attaining high frequency synchronous clock distribution using electrical interconnections on MCM is difficult due to large fanout and long interconnection paths. When a high fanout interconnection length is larger than approximately 10 cm at a clock frequency of 500 MHz or greater, electrical interconnection latency becomes an issue in clock distribution.

In the electrical H-tree clock distribution system, when the signal propagation delay roughly matches the signal rise and fall time, the interconnection electrically isolates the driver from the receivers. The receivers no longer behave as direct loads to the driver and thus the interconnection impedance becomes the driver loads and the input impedance to the receiver. Thus the signals can be distorted by transmission line effects producing reflections, overshoot, undershoot, ringing or crosstalk. In the transmission line design, the characteristic impedance, signal reflection at discontinuities, terminations and the ratio of line resistance to characteristic impedance should be carefully considered to insure satisfactory performance of the signal transmission which is required to match or exceed the design requirements. The characteristic impedance of a transmission line is a key determinant of propagation delay, noise levels and power dissipation of the interconnection network.

The electrical H-tree network design on MCMs additionally requires careful consideration of signal driver capabilities, MCM characteristics (substrate size, substrate material, dielectric material, type of metal), number of components on the MCM, operation frequencies of interest and so on. The control of reflected signals along a transmission line influences the signal transmission quality. Thus it is required to have impedance matchings at every possible branching point. The source-end termination is a popular clock line termination method since this allows no dynamic power dissipation. The interconnection line resistance influences the clock rise time at the receiving end and suppressing the line resistance to a small value can be achieved by scaling the clock line dimensions. For very high frequency signal transmission, the skin effects of the metal conductors could increase the effective line resistance and these should also be included for calculating the transmission line resistance. The dielectric loss can also increase the transmission line resistance. All of these three contributions to transmission line resistance should be considered and suppressed to a small value compared to the transmission line characteristic impedance so that the interconnection network can behave as lossless transmission lines.

General guidelines for designing an electrical H-tree network are: (1) ascertain the network specification such as clock frequency, risetime, falltime, maximum allowable skew, module size, number of components on MCM and type of MCM and interconnection materials; (2) identify the clocked component sizes (i.e., IC sizes on the MCM) which require a maximum clock skew less than the design specification; (3) design a candidate H-tree network by varying wiring parameters and number of unmatched branches so that the network can accommodate the design specifications such as driver capability, bandwidth specification, number of nodes, maximum allowable wire width and thickness and so on; and (4) simulate the performance of a candidate network. If it satisfies the design requirements, use this design. If not, perform steps (3) and (4) again, while using a simulator to investigate the transient response of the H-tree network.

A performance evaluation of an example electrical H-tree network uses a lossless transmission line analysis with a SPICE simulation. The line resistances of the H-tree networks are negligible compared to the characteristic impedance to model the network as lossless transmission lines. Assume that the load impedance at each line termination is $50\Omega$, matched to the receiving buffer load impedance. The impedance matchings at branches are established by choosing appropriate wire thicknesses, widths and dielectric thicknesses. Unfortunately, if all the branches in the 16 node H-tree network are matched, the characteristic impedance at the clock driver end is $3.13\Omega$, which is too low to drive even the more capable, high-power clock drivers implemented in ECL or advanced CMOS.

To relax the driver requirement, the network should be designed to have one or more levels of unmatched branches. Thus, a more complex transmission line design problem must be solved where effects of multiple reflections at the unmatched branch locations must be taken into account. Determine the transmission line wire thickness and width to optimally satisfy the wire dimension requirements for a single level of unmatched locations. It is generally desirable to have a small wire dimension for high interconnection density. The ratio of metal-to-dielectric thickness influences the wiring density and the minimum wire dimension is achieved by choosing it between 1.5 to 2.0. Assume a dielectric-to-metal thickness of 1.5 is chosen.

Using the SPICE simulation, as the number of levels of unmatched branches increases, beginning at the final termination nodes, the simulated signal rise time degrades and the network bandwidth decreases (although the driver power requirements significantly decrease). As the MCM size grows from 4 cm to 10 cm for the unmatched configuration (in only the final terminal branches), the signal rise time degrades from 0.63 ns to 1.32 ns to reduce the network bandwidth. For a 16 node network on $8 \times 8$ cm$^2$ MCM, the maximum clock frequency supported is about 300 MHz with unmatched branches at only the final terminal branches.

The electrical H-tree clock distribution network on MCMs has a hard limit on the fanout due to driver capability, network bandwidth requirement and limited signal layers on the silicon MCM. The best ECL and advanced CMOS drivers have driver resistances in the range of 5 to $7\Omega$ and 10 to $20\Omega$, respectively. Driving a fully impedance matched 16 node H-tree on $8 \times 8$ cm$^2$ MCM requires a driver resistance of approximately $3.13\Omega$ which is impossible to provide given today's technology. Further, the wire width at the clock driver must be about 400 $\mu$m which may violate wiring density requirements. Thus, for frequencies above 300 MHz, clock distribution on MCM is very difficult to achieve even for 16 nodes, let alone for a larger number.

Generally computer systems can be classified as synchronous systems or asynchronous systems according to their clocking schemes. In synchronous systems every component of the computer system is in lock-step controlled by a global system clock. Thus, there is only one global system clock generated by a single oscillator. Synchronous clocking has been the choice for computer systems with small size and single or a small number of CPUs. A synchronous system can be implemented by numerous schemes such as single phase clocking with latches, edge-triggered flip-flops, two phase clocking with single or double latches or multiphase clocking at the component input boundaries.

Asynchronous systems have multiple independent local clock sources for the system. Communications between independent subsystems are maintained by asynchronous interfaces or selftimed logic signals. An asynchronous system can be configured as locally synchronous islands communicating through asynchronous connections. In self-timed systems, self-timed signals (acknowledge and request) replace the role of clock signals. As a result, self-timed systems do not even need clock signals. A self-timed system can be configured as self-timed subsystems communicating through asynchronous protocols or self-timed signals. In either case, no external clocks are necessary.

In general, synchronous systems have better performance compared to asynchronous systems. Synchronous systems are much easier to design and test, and they use less hardware. Debugging the asynchronous interfaces between independent subsystem is usually extremely difficult, particularly for large systems. The reduction of design complexity of the computer system with better system throughput makes synchronous clocking an ideal choice. However, controlling the global system clock signals with a small skew bound at high clocking frequencies throughout a large computer system has so tar prevented practical implementation of large synchronous systems. For this reason, large distributed computer systems are typically configured at the current time as asynchronous systems at the cost of reduced performance and increased design complexity.

For distributed multiprocessor computer systems there is generally no global system clock, mostly because of the problems related in the above paragraphs. Rather, system synchronization is maintained by using a variety of message passing schemes, which introduces considerable complexity in programming and efficiently using such machines. Synchronous global clock distribution, however, is highly desirable for distributed computer systems to simplify their architecture and enable higher speed performance.

An electrical interconnection with a large fanout on a large MCM required to operate at very high frequencies has difficult problems due to limited network bandwidth and driver capability. Optical interconnection is beneficial for a large fanout signal (like a synchronous global clock signal) on an MCM since it has large bandwidth, small power consumption and large fanout capability. An optical H-tree is needed when a high speed synchronous global clock signal should be distributed on a large MCM with a large fanout (16 or more). In addition, an optical H-tree is more suitable for flexible placement of ICs on an MCM by supporting unbalanced H-trees with small design modification and essentially no performance degradation.

SUMMARY OF THE INVENTION

Accordingly, it is a primary object of the present invention to provide an optical clock distribution network that has very wide bandwidth, very low signal skew, no electromagnetic interference, low power consumption, and large fanout.

It is another object of the present invention to provide an optical clock distribution network that uses guided wave optical routing because of its superior physical flexibility in controlled routing and fabrication, and because of the ease of creating a single-source to wide fanout distribution structure.

It is yet another object of the present invention to provide an optical clock distribution network that provides integrated waveguides within a multichip module (MCM).

Another object of the present invention is to provide an optical clock distribution network that operates in a symmetrical network, or operates in an asymmetrical network.

It is a further object of the present invention to provide a high-speed multi-wavelength optical communication network that is capable of simultaneously transmitting multiple optical signals at different wavelengths (multiple wavelength signals) frown a source to several receiving devices over an optical waveguide.

It is yet a further object of the present invention to provide a high-speed optical communication network that is capable of simultaneously transmitting multiple optical signals each on a different waveguide, and each waveguide carrying one or more different optical wavelengths from at least one source to at least one receiving device at the destination.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved H-tree optical waveguide configuration is provided for efficient synchronous global clock distribution to the various modules mounted on an MCM structure which nearly eliminates clock skew. In one preferred embodiment, the waveguide segments are made of a hybrid Silica Glass/SiON construction, which operate as perfect transmission lines. The network is constructed of an input Butt coupler, directional 3 dB couplers, vertical couplers and grating output couplers using buried type Silica Glass waveguide and ridge type SiON waveguides. The optical H-tree network delivers system clock signals to well over 16 nodes at multi-GHz ranges with power consumptions less than an electrical counterpart, and it can be extended to at least 64 nodes and 1 GHz clock frequency assuming qualified laser diode sources and photodiode receivers exist, since the system performance is not limited by the optical waveguide distribution network of the present invention. The It-tree can be an equidistance network, or it can tolerate some asymmetry for use with non-periodic array locations of ICs located on the MCM.

The overall optical waveguide-based clock distribution network for MCMs consists of three subsystems: (1) a source of modulated light with sufficient power and stability to drive the component clock receivers, using, e.g., a laser diode with a modulation current driving circuit and laser-to-fiber coupler using, such as GRIN lens with a fiber pigtail in a common package; (2) an optical distribution network to convey the optical source signal to every receiver site, using, e.g., an optical fiber from the laser diode source, a fiber-to-waveguide contact coupler, channel waveguides to convey the optical signal to the receiving sites, 3 dB directional couplers to produce the needed fanout, and output grating couplers or micro-mirrors to interface the waveguide outputs to receiver detectors; and (3) an optical detector and amplifier at each receiving site (or node) for converting the optical clock signal to electrical form for use by the integrated circuit components mounted on the MCM.

The optical distribution network can be constructed on an MCM in which the bottom layers are used to contain the optical waveguides and the upper layers contain the electrical conductors, and the optical outputs are directed by micro-mirrors through air gaps in the upper layers toward photodetectors located on the integrated circuit components mounted on the MCM. The network can alternatively be constructed on an MCM in which the bottom layers are used to contain the electrical conductors, which are made of high-temperature materials, and the upper layers contain the optical waveguides which have vertical output couplers to direct the optical outputs toward photodetectors located on the integrated circuit components mounted on the MCM. The longer optical waveguide segments are made of silica glass which transition, via a vertical directional coupler to a waveguide made of SiON. After this transition, the optical signals are redirected at an angle via a grating output coupler.

One example embodiment of the synchronous optical clock distribution system of the present invention is capable of distributing a clock with return-to-zero signals at 500 MHz minimum, maximum skew and maximum signal rise time each less than 10% of the clock period, and a bit error rate (BER) of $10^{-17}$. These specifications are expected to meet the performance needs of high-performance multiple CPU MCM systems developed over the next several years. A clock fanout of sixteen is easily achieved on an MCM substrate size of approximately 8 cm $\times$ 8 cm.

In an alternative embodiment, the high-speed optical waveguide is configured for use as a multi-wavelength communication network that communicates signals to various integrated circuits mounted on a multichip module. Several signals having different optical wavelengths can be injected simultaneously into the waveguide network and sent through the network to all potential destinations without interfering with one another, since photons do not interact. At the source integrated circuit that is to transmit a signal, each electrical signal counterpart to be transmitted is converted into an optical signal by a modulated laser diode, and the laser diode's output is directed into an optical multiplexer. The output of the optical multiplexer is directed into the optical waveguide, thereby transmitting the optical signal throughout the waveguide and into the ICs that are to receive the signal. Each receiving integrated circuit has an optical demultiplexer which receives all of the signals being directed down the optical waveguide and separates them according to their wavelength. The demultiplexer has several outputs that can be directed into individual photodetectors on the receiving integrated circuit, thereby converting the optical signals back into electrical signals.

In another alternative embodiment, multiple high-speed optical waveguides are provided for use as a multiple optical signal communications network that communicates signals from multiple optical sources to various integrated circuits mounted on a multichip module, in which each of the integrated circuits has multiple receiving devices. In one mode, each optical waveguide is injected with a single optical wavelength (sometimes referred to as "monochromatic") using a single laser diode at the source and using a single photodetector at the receiving point. These multiple optical waveguides can be stacked upon one another in vertical layers for ease of network configuration on the multichip module, and at the receiving end can be directed onto a multi-stage micro-mirror that individually directs the outputs of each waveguide onto individual photodetectors mounted within each receiving integrated circuit. Once received by this integrated circuit, the optical signals are converted back into electrical signals, thereby allowing for parallel data to be transmitted across the network. In a second mode of operation, each of the optical waveguides is injected with several signals having different optical wavelengths by use of an optical multiplexer, as described hereinabove. At each receiving integrated circuit, an optical demultiplexer is used to separate the individual wavelengths of the signals from each waveguide (which are multi-wavelength signals), thereby allowing for a much expanded amount of parallel data to be transmitted down the multiple waveguides and across the network.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
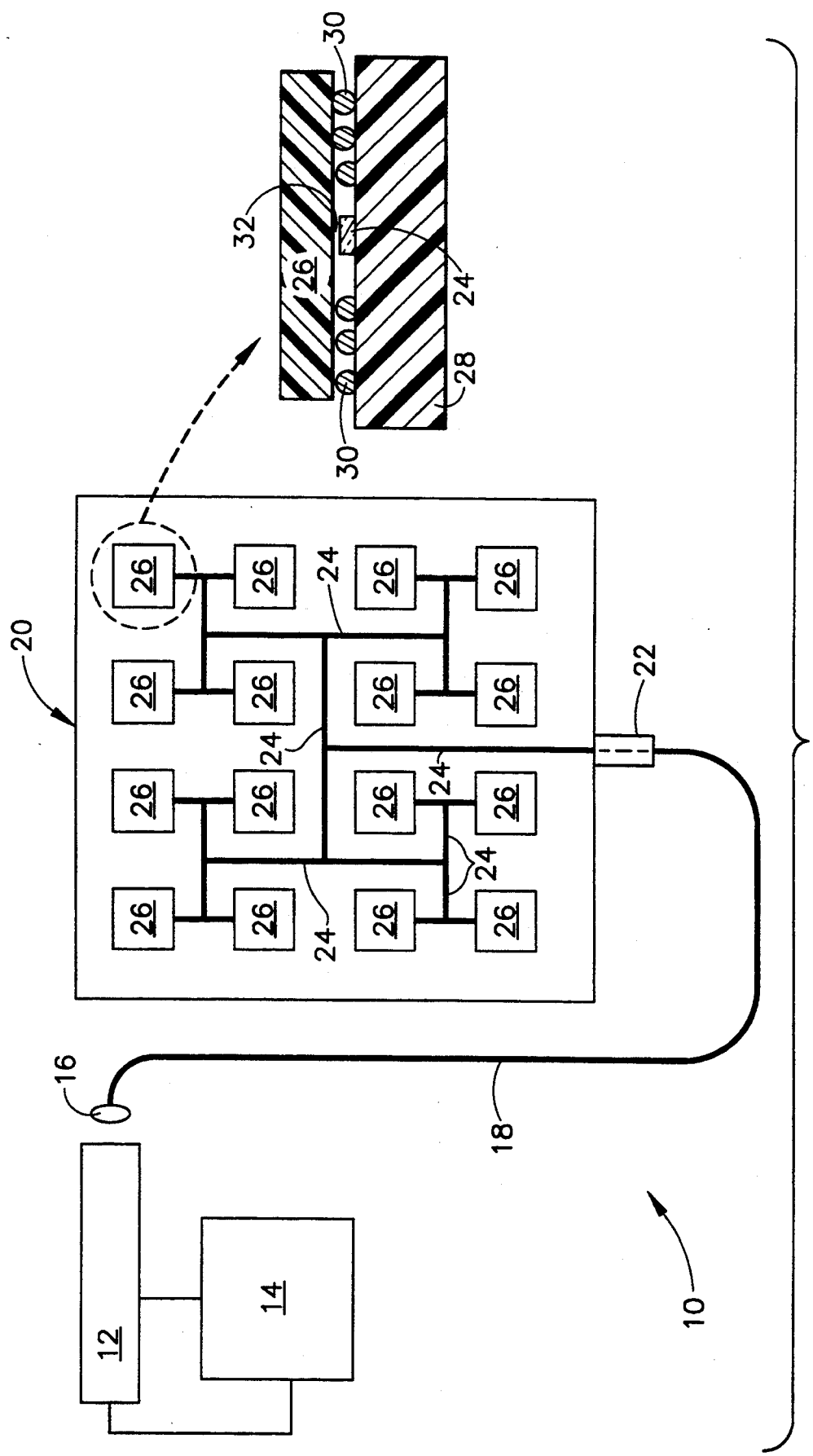
FIG. 1 is a diagrammatic view of a low-skew high-speed optical clock distribution network that is constructed according to the principles of the present invention.

Referring now to the drawings, FIG. 1 shows a functional block diagram of a multichip module (MCM) optical interconnection system, generally designated by the index numeral 10. Optical interconnection on an MCM involves electrical-to-optical signal conversion, optical signal propagation/distribution and optical-to-electrical signal conversion. The design goal of the clocking distribution network 10 of the present invention is to integrate these three components minimizing noise, power consumption, signal distribution loss, device size, system rise time, and global clock skew, while maximizing speed, system bandwidth and coupling efficiency of signals with as simple a device configuration as possible.

Optical signal generation is accomplished using a laser diode 12 with a modulation current driving circuit 14 and a laser-to-fiber coupler preferably using a GRIN (graded index) lens 16 with a fiber pigtail (to hold the laser, lens, and connecting optical fiber), in a common package. The signal propagation and distribution network consists of an optical fiber 18 from the laser diode source 12, a fiber-to-waveguide coupler 22, channel waveguides 24, 3 dB couplers 34 (see FIG. 2), and output grating couplers 38 (see FIG. 2) to interface to photodetector diodes 86 (see FIGS. 6 and 7). The signal detection part is composed of photodiode 86, a low-noise and high-gain amplifier, filter, and regenerator (not shown). In the basic system, there is preferably one photodiode detector system associated with each clocked integrated circuit 26 on the MCM 20.

The source clock signal can be generated by laser diode 12 with a modulated current driving circuit in which the modulation can be performed either internally, where the modulation circuit is integrated with the laser diode using a separate current modulator, or externally through the use of electro-optic modulation techniques. Either of these modulation methods can modulate the optical signals at multi-gigahertz rates. However, for simplicity of design, direct internal modulation of laser diodes is preferred. A laser diode is preferred because it is a source of coherent electromagnetic energy, and has a directed output. For example, In-GaAs laser diodes produce high power, high speed, single mode optical signals with small threshold currents at a variety of wavelengths which makes them a very useful optical source. Their present limited lifetime is a subject of active research, and adequate lifetimes are expected in the future. Laser diode 12 will preferably have an output power rating approximating 100-200 mW, and will be a single-mode, edge-emitting laser diode.

The optical signal generated by the laser diode is coupled into an input (or "root") segment of the waveguide (that is integrated on MCM 20) by a short optical fiber using a GRIN lens or similar coupling method at both the diode-fiber interface (using a GRIN lens 16) and at the fiber-waveguide interface (using a Butt coupler 22). The waveguide 24 splits the optical clock signal (i.e., the waveguide evolves into multiple segments) and propagates it with little loss before arriving at the photodetectors 86 located at each integrated circuit site 26 on the MCM 20. Single mode waveguide propagation is preferred since it readily supports various structures for signal distribution such as bending, branching, and coupling with predictable performance and reasonable losses. Gradual bending is used to change waveguide directions, while Y-branches or 3 dB directional couplers 34 are used to perform optical splitting. Either hologram grating couplers 38 or micro-mirror structures 112 (see FIG. 7) can be used to effect the waveguide-to-detector coupling. Some of the components used for the optical waveguide structures fabricated on MCM 20 are fiber-to-waveguide butt couplers 22, Y branches (not shown), 3 dB directional couplers 34, gradual/sharp bends (not shown in detail), X junctions, T junctions (not shown), and hologram grating couplers 38.

Figure 2:
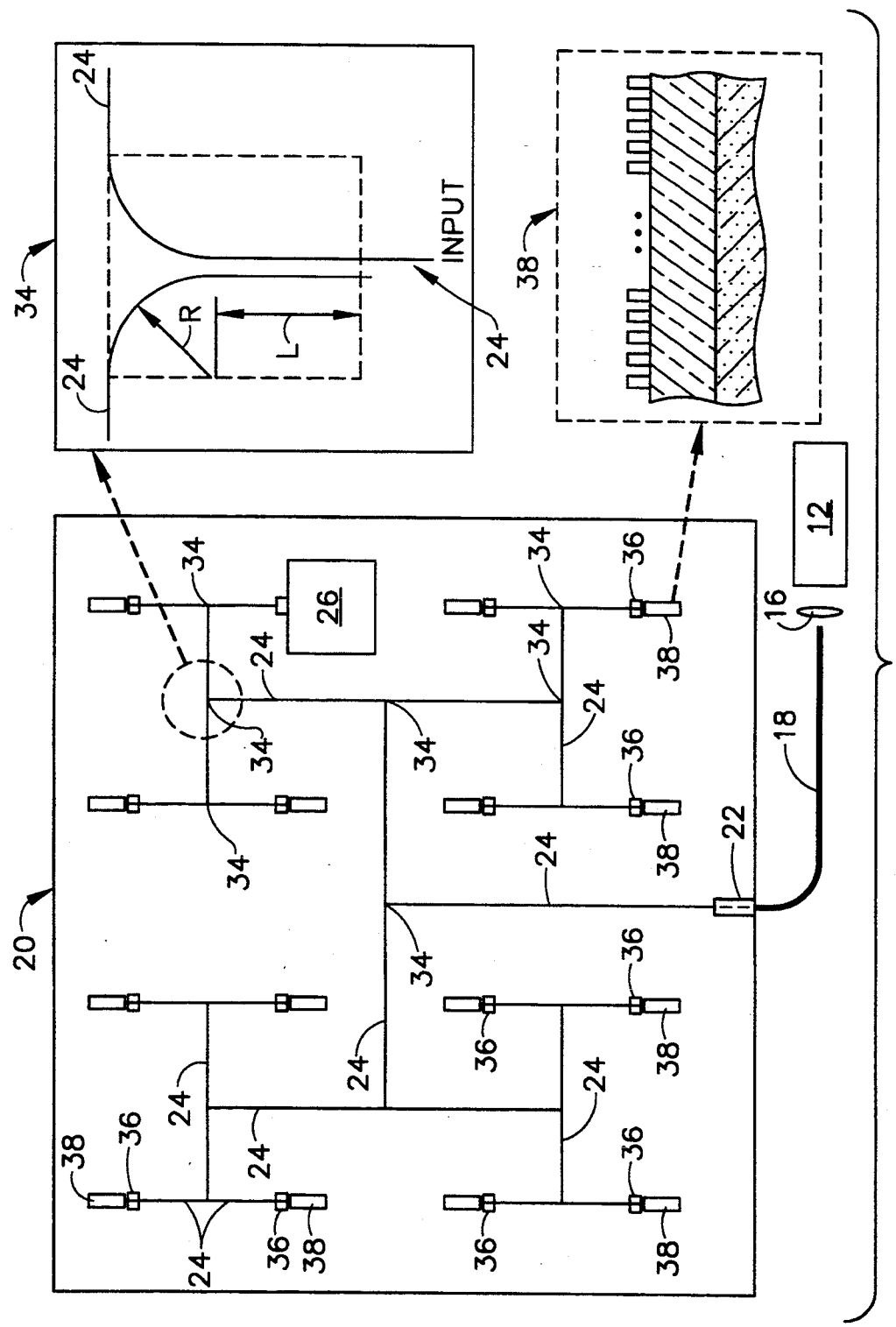
FIG. 2 is a diagrammatic view of the optical clock distribution network of FIG. 1, and provides more detailed information on the various optical components of the network that direct or modify the optical signals.

An H-tree configuration for equidistant electrical clock distribution is frequently used in multiple CPU designs on single VLSI, but has not been exploited on MCM substrates using optical rather than electrical interconnection. As noted hereinabove, optical implementation of the H-tree configuration becomes increasingly advantageous compared to electrical implementation as the number of chips increase on an MCM. This structure supports low skew clock signal distribution which enables globally synchronous operation on an MCM. A 16-node H-tree optical clock distribution network on, for example, an 8 cm×8 cm MCM, can be realized by combinations of waveguide structures such as 3 dB directional couplers, 90 degree smooth bending sections, fiber-to-waveguide butt couplers, and grating assisted output couplers fabricated utilizing silicon oxynitride (SiON) or silica glass channel waveguide structures using the configuration as shown in FIG. 2.

The goal of the optical H-tree network design of the present invention is to eliminate clock skew while minimizing signal losses, structure sizes, and power inequality at different positions of H-tree nodes while maximizing the total number of H-tree nodes and network bandwidth. It is desirable for optical waveguide structures to have low losses, small sizes and allow for efficient and integrated fiber-to-waveguide and waveguide-to-detector couplers. Controlling clock skew is very difficult at higher frequencies. The advantages of optical interconnections are large information capacity, no electromagnetic wave interference, high interconnection density, low power consumption, high speed, and planar signal crossing. Planar signal crossings are possible because photons do not interact with each other in contrast with electrons, thereby permitting single layer interconnection. The use of optical interconnection also supports the possibility of parallel processing capability and fabrication economy when electronics are integrated with photonic circuits. Guided-wave based optical interconnections can readily be interfaced with optical fibers which are already in widespread use for high speed computer network systems.

Currently, optical interconnection technologies can be divided into two groups: free space-based and guided-wave based. Free space interconnections are either the three dimensional one-to-multiple broadcasting schemes based on computer generated holograms mounted above the multiprocessor MCM assembly, or multiple-to-multiple shuffle network style interconnections, fabricated between arrays of processors. Guided-wave optical interconnections are based on the use of optical fibers and integrated waveguide structures such as couplers, corner bending sections, reflectors, straight line segments and so on. Guided-wave optical interconnections use planar signal distribution as opposed to three dimensional free-space interconnection. Guided-wave optical interconnections are believed to be more realistic than free space interconnections in the near future, because free-space interconnection requires difficult alignment of the computer generated hologram and has integration compatibility problems with the existing electronics for packaging.

Optical waveguides can successfully be formed using both crystalline and non-crystalline materials. Optical waveguides formed using non-crystalline materials generally provide lower propagation loss and more economical fabrication, although crystalline materials, including semiconductors, are necessary for performing active functions such as modulation. Since the primary interest is in the passive functions of signal division and distribution, non-crystalline materials are preferred. The most effective non-crystalline optical waveguide materials have been silica layer, phosphor-silicate glass layer, and silicon oxy-nitride (SiON) layer, all on silicon substrates. Regardless of the material type, waveguides are made by initially thermally oxidizing a layer of $SiO_2$ on a silicon substrate followed by deposition of the waveguide core material. Lithography, etching and deposition of additional layers of materials of slightly different compositions then are carried out to form the final channel waveguide structure. For design purposes these different channel waveguide configurations can be divided into two classes: (1) those in which there is a small difference in refractive index between the channel core and surrounding regions, and (2) those in which there is a much larger difference in refractive index between the channel waveguide core and some of the surrounding regions.

The H-tree network shown in FIG. 2 is composed of components such as integrated single mode channel optical waveguides 24, which are based upon SiON and silica glass and have small propagation losses, typically 0.1 to 0.3 dB/cm. Also included are various support structures for signal distribution, such as directional couplers 34, which are designed for equal power division (3 dB) with low excess losses, small overall size and uniform power distribution. The advantages of equal power division and simple fabrication compared to Y-branches (or Y-junctions) and T-junctions make the directional coupler a reasonable choice for 3-dB couplers when used in single wavelength optical waveguides (those containing light of only one wavelength). In a situation where light is arriving through one particular (input) waveguide segment and is to be directed into two other waveguide (output) segments, it is often said that the input segment "evolves" into the two output segments. Another support structure is Butt coupler 22. V-groove assisted fiber-to-waveguide Butt coupling has low power loss if the numerical aperture, the field profile and fiber-to-waveguide alignment are matched.

The directional coupler 34 consists of two parallel optical waveguides with small separation such that optical power from one channel can be transferred to the other. When two channels are identical, 100% power transfer is possible by controlling the channel separation and coupling length. For unsymmetric channels, generally less than 100% power is transferred, unless external phase matching structures, such as gratings, are integrated near the waveguide to compensate for the phase velocity differences between the two channels. The following equations defines the directional coupler power transfer for symmetric channels: $P_1(L) = P_0 \cos^2(CL)$, and $P_2(L) = P_0 \sin^2(CL)$, where L, C, $P_1$, $P_2$, and $P_0$ are the coupling length, coupling coefficient, input channel power, output channel power, and total power. A 3 dB directional coupler can be designed by choosing an appropriate coupling length to have a phase shift equal to $\pi/4$. A one-input/two-output 3 dB coupler is shown in FIG. 2, and is well known in the art.

The table below gives the 3 dB channel length as a function of channel separation (S) and bending radii at 500 and 2000 $\mu$m, for a silica glass waveguide configuration.

| Separation ($\mu$m) | $L_{3dB}$ ($\mu$m) with R = 550 $\mu$m | $L_{3dB}$ ($\mu$m) with R = 2000 $\mu$m |
|---|---|---|
| 1 | 36 | 19 |
| 2 | 135 | 119 |
| 3 | 418 | 401 |
| 4 | 1224 | 1208 |

Three different waveguide designs are contemplated in which each is based on a different material group: SiON, Silica glass and a hybrid combination. In the case of a SiON waveguide configuration, it would preferably have a low propagation loss (e.g., 0.1 to 0.3 dB/cm). A refractive index of SiON of 1.54 is preferred at 1.3

μm wavelength, which depends on the oxygen and nitrogen composition ratios. A thermally oxidized silicon dioxide buffer (not shown) located on top of the silicon substrate serves as a buffer layer to prevent substrate coupling energy loss. If the bottom buffer layer thickness for the SiON waveguide structure is about 5.0 μm, waveguide substrate loss is negligible. The SiON waveguide layer is then deposited using the LPCVD (low pressure chemical vapor deposition) process followed by deposition of an optical buffer layer also made of silicon dioxide. The maximum thickness of the waveguide layer is about 0.6 μm which unfortunately tends to limit efficient fiber-to-waveguide coupling.

Figure 5:
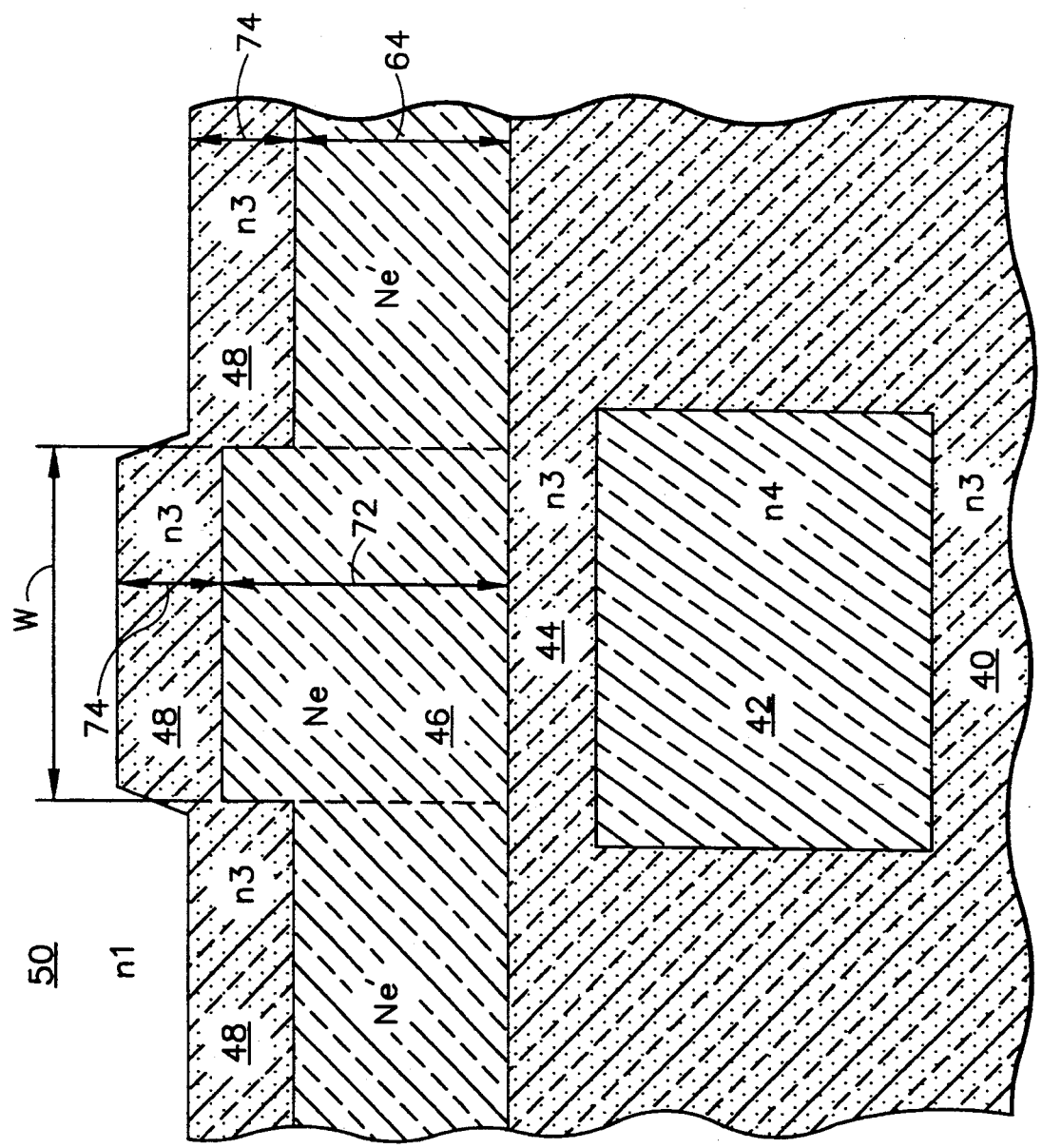
FIG. 5 is an end elevation view of the optical waveguide used in the network of FIG. 1, showing details of such a channel waveguide having a variable core thickness.

Channel waveguides using silica glass can be formed on top of Si substrate by applying flame hydrolysis deposition along with photolithographic and reactive ion etching processes successively. These channel waveguides have low propagation losses (less than 0.1 dB/cm ) and very thick layers are possible (over 200 μm) with 0.1 to 3.0% refractive index differences between core and cladding. A buried channel waveguide structure 42 is preferred, as shown in FIG. 5. This structure is chosen because it is readily available commercially and supports 3-dB directional coupler. The buffer material is preferably $SiO_2$, and makes up the lowest buffer layer 40 and the upper buffer layer 44.

The upper buffer layer 44 thickness is preferably approximately 0.1 μm to ease the integration of the output grating coupler. The index difference between the core and cladding influences the size and loss of the 3-dB directional coupler. A core refractive index of 1.48 is chosen since it is a typical value in commercially available silica glass waveguide structures. Since the vertical cutoff thickness is greater than 3 μm for this 4 layer waveguide structure, the core thickness is preferably 3 μm to more closely match the input fiber diameter (D=3 μm). The single mode width for lateral confinement is preferably 2.68 μm, with a channel width of 2.5 μm to minimize the fiber-to-waveguide coupling loss. To achieve a bending loss no greater than 0.01 dB requires a minimum bending radius of 550 μm which gives 0.01 dB for this channel structure. On the other hand, bending radii as large as 2000 μm can be tolerated.

The four-layer structure with $SiO_2$ overlay, generally designated by the index numeral 48. shown in FIG. 5 forms channel waveguides by varying core thickness with a constant overlay thickness. This configuration is selected because creating the channel waveguide structure by varying the upper buffer thickness imposes difficulties in contacting the grating coupler with the SiON core. The effective refractive index of 0.6 μm thick SiON (the upper waveguide 46) with a 0.3 μm overlay thickness at 1.3 μm wavelength is calculated to be 1.4764 and 1.4740 for TE and TM modes respectively for the four-layer planar waveguide, and acts as the effective waveguide in the middle area of FIG. 5, having the thickness designated by the vertical dimension 72. Effective refractive indices of waveguides are a function of SiON core thickness, wavelength and waveguide index profile.

The lateral confinement of an optical signal is created by forming a thinner waveguide thickness outside of the channel region (at the locations indicated by the thickness designated by the vertical dimension 64), thereby creating a lateral effective refractive index difference (Ne-Ne') at these locations that is smaller than the effective refractive index Ne within the central region at dimension 72. This lateral index profile is a key parameter to the design of a 3 dB directional coupler, and strongly influences its size and losses. It should be noted that the thickness of the top buffer layer 48 preferably maintains the same thickness dimension, as indicated on FIG. 5 by the vertical dimension 74.

The size of a 3 dB directional coupler 34 and associated channel sections has a minimum bounding area of $2R \times (R+L)$ at a particular lateral effective index difference (see FIG. 2). The channel separation in the coupling region of a 3 dB directional coupler is preferably four (4) μm to ease fabrication. An off-channel SiON thickness of 0.38 μm results in the smallest 3 dB coupler bounding area where coupling length (L) and bending radius (R) are 1176 and 1325 μm with 0.009 dB bending loss. However, this thickness is too small for efficient fiber-to-waveguide coupling. Furthermore, the bounding area at this value need not be any smaller than that of an integrated circuit footprint (e.g. 10 μm×6 μm). For these reasons, the off-channel SiON thickness is preferably 0.5 μm which results in L=900 μm, R=3670 μm, with a 0.009 dB bending loss.

The above two designs (SiON and silica waveguides) have both merits and pitfalls. The SiON waveguide supports efficient grating couplers, while it has poor fiber-to-waveguide coupling due to a very thin core layer. The silica glass waveguide has good fiber-to-waveguide coupling and superior signal distribution network structure compared to SiON, but it cannot support the grating coupler due to its waveguide index profiles. The SiON and silica glass waveguides complement each other, however, and a hybrid design using the best features of both results in an improved system solution.

Figure 3:
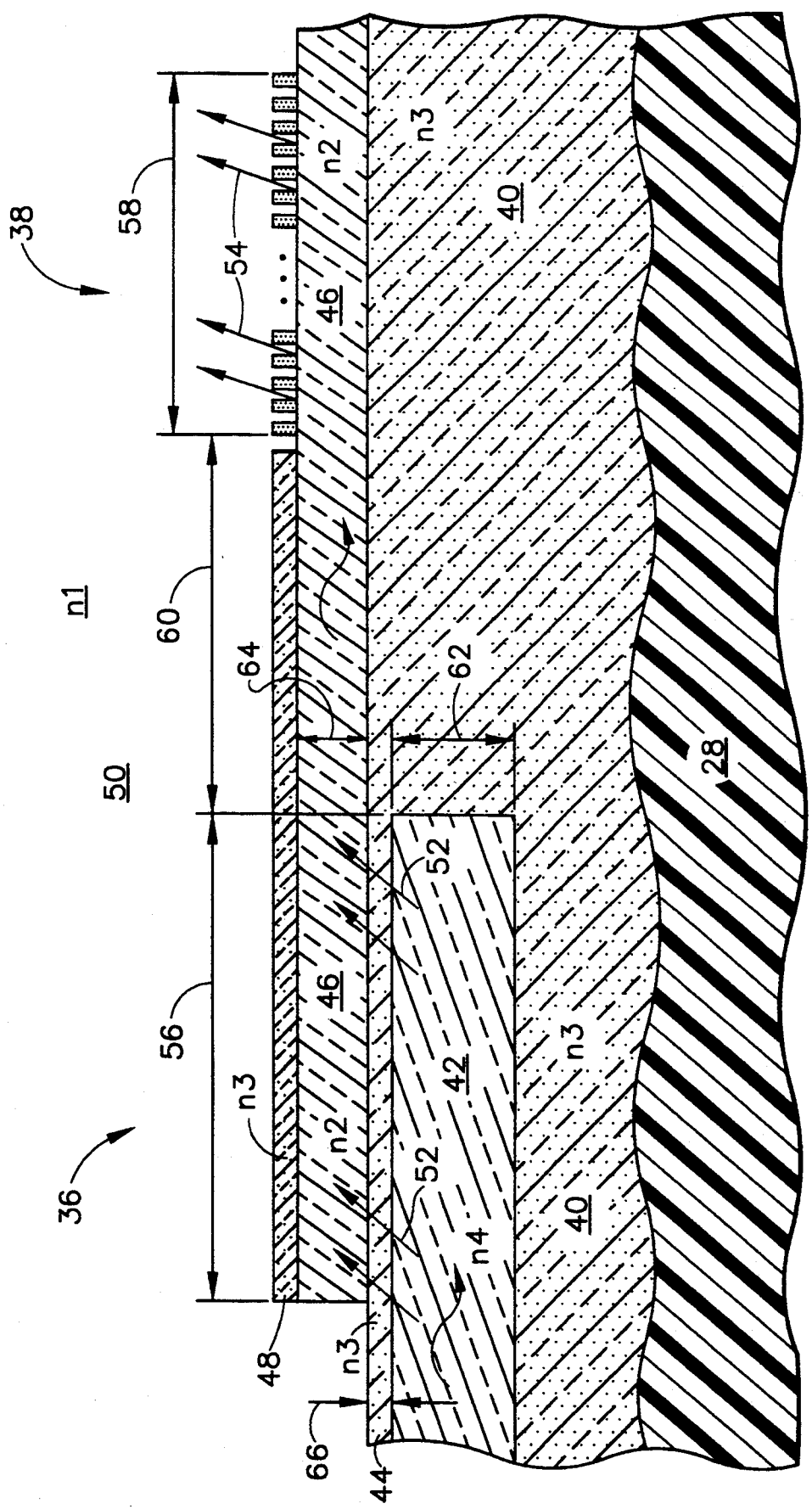
FIG. 3 is a side elevation view of a portion of the optical waveguide used in the network of FIG. 1, showing the details of a vertical directional coupler having an unequal waveguide structure.

The hybrid waveguide structure employs a silica glass H-tree network for signal distribution components (using waveguides 42—see FIG. 3), which is combined with an output coupling SiON waveguide 46 deposited on top of silica channel waveguide 42 to create an efficient coupling between the two waveguides. The optical signal inside the silica waveguide 42 is thereby coupled into the upper SiON waveguide 46, following the light path 52, by utilizing an unsymmetric directional coupler scheme having unequal waveguide structure, creating a vertical directional coupler designated by the index numeral 36.

For maximum vertical coupling, the propagation constants of silica and SiON waveguides should have similar values and small separation between the waveguides. For these reason, the separation between the two layers is preferably a buffer layer 44 that has a vertical thickness, indicated by the index numeral 66, of 0.1 μm and is made of $SiO_2$, and having an index of refraction designated "n3" on FIG. 3. The SiON waveguide 46 preferably has a thickness, indicated by the index numeral 64, of 0.5 μm, and having an index of retraction designated "n2" on FIG. 3. The top buffer preferably comprises an 0.3 μm $SiO_2$ overlay layer 48, having an index of refraction designated "n3" on FIG. 3. The silica glass waveguide 42 has an index of refraction designated "n4" on FIG. 3, and a vertical thickness indicated by the index numeral 62. The substrate material, which effectively creates a buffer 40, is preferably $SiO_2$, and has the same index of refraction n3 as buffer layer 44.

Using the above dimensional and material values, a maximum 61% optical coupling between waveguides 42 and 46 is possible at a coupling length, designated by the index numeral 56, of either 70 or 210 μm. Deposition of a SiON layer on top of the silica waveguide is not expected to destroy the bottom silica waveguide structure during fabrication and the output grating coupler 38 can be easily integrated into the SiON waveguide. The SiON and silica glass fabrication processes are compatible with each other if the silica glass is fabricated first, since silica glass requires 10-15 hours heating at 1200° C. and SiON needs about 30 minutes heating at 750°-800° C.

Some example specifications for an exemplary Hybrid design are tabulated below:

| Channel waveguide: | |
|---|---|
| Type of waveguide | Hybrid |
| SiON overlay thickness | 0.3 μm |
| SiON waveguide thickness | 0.5 μm |
| Upper buffer thickness | 0.1 μm |
| Waveguide thickness at channel | 3.0 μm |
| Under buffer thickness | 5.0 μm |
| Channel width | 2.5 μm |
| Grating coupler: | |
| Output coupling angle, θ | 80 degree |
| Grating period, Λ | 0.99 μm |
| Grating index | 1.55 |
| Grating depth | 0.28 μm |
| Radiation decaying factor. α | 0.0024 μm$^{-1}$ |
| Grating length for 80% power | 333 μm |
| 3 dB directional coupler | |
| Channel separation, S | 4.0 μm |
| Channel width, W | 2.5 μm |
| Bending radius, R | 2000 μm |
| Coupling length, L | 1208 μm |
| Coupler bending loss | Less than 0.01 dB |
| Vertical coupler | |
| Channel separation, S | 0.1 μm |
| Upper channel width, W1 | 0.5 μm |
| Under channel width, W2 | 3.0 μm |
| Coupling length, L | 70 or 210 μm |
| Maximum coupling efficiency | 61% |
| Coupling loss | Less than 2 dB |

Figure 4:
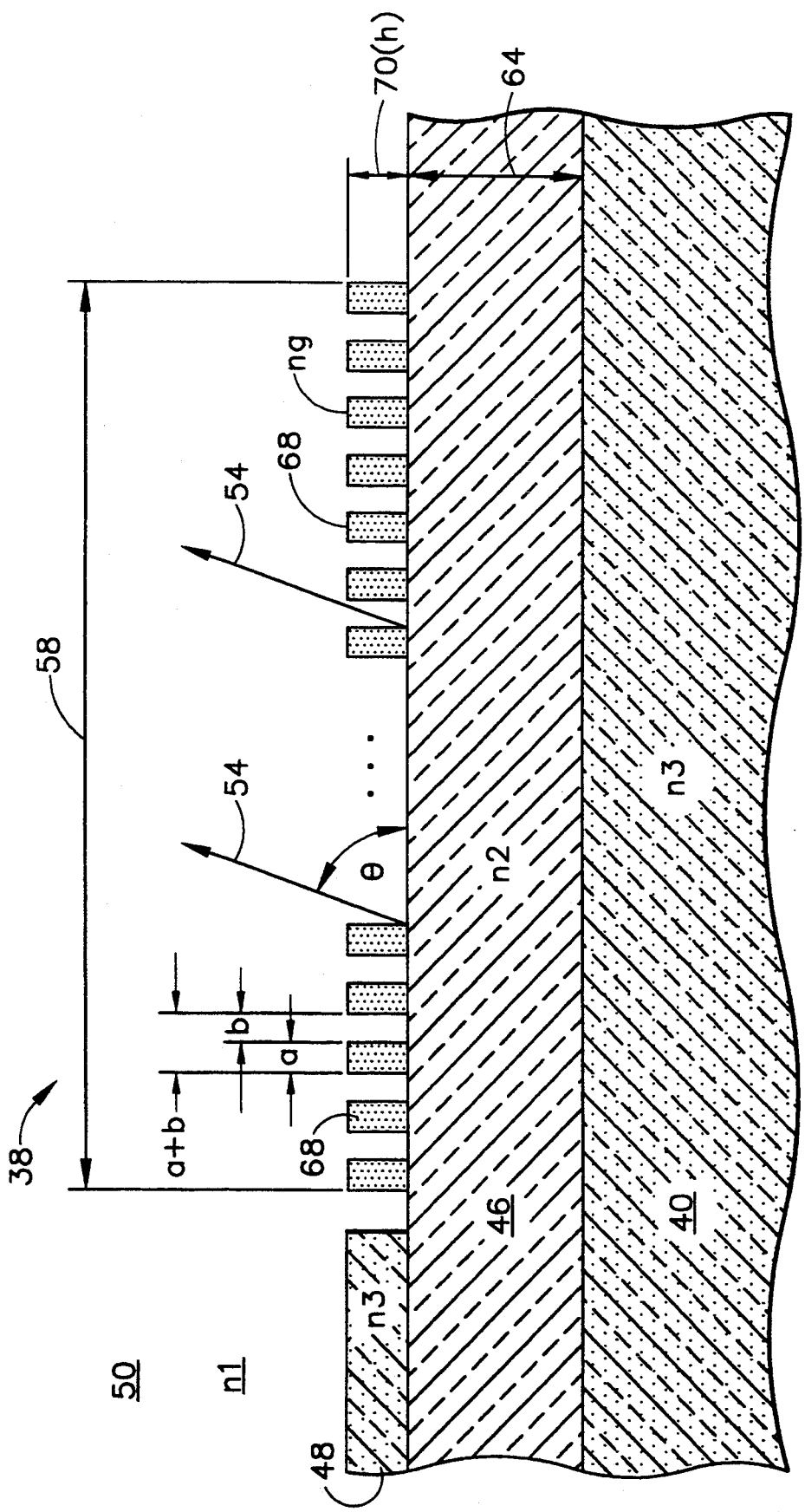
FIG. 4 is a side elevation view of a portion of the optical waveguide used in the network of FIG. 1, showing the details of a grating assisted output coupler.

Grating structures positioned on top of waveguides as shown in FIG. 4 influence wave propagation characteristics of the guided mode and can be used to achieve phase matching, which is a necessary condition for efficient input and output mode coupling. The grating assisted output coupler, generally designated by the index numeral 38, is an integrated part of the waveguide structure, and efficient output coupling is possible with small grating coupler size when the waveguide index profile, grating period, grating depth and grating material are carefully chosen. Such grating output couplers 38 are placed at locations (or "termination points") in the waveguide structure where the optical signals traveling horizontally (in "guided mode") through waveguides 42 and 46 are to change direction, so as to travel substantially vertically (in "radiation mode") away from MCM 20.

To achieve coupling from a guided mode to radiation mode, the grating period a+b (on FIG. 4) is adjusted to satisfy the following phase matching condition:

$$(2\pi m/\Lambda) + (\beta_1 - \beta_0) = 0$$

where m, Λ (=a+b in FIG. 4), $\beta_1$ and $\beta_0$ are the order of diffraction, grating period, radiation mode propagation constant, and guided mode propagation constant. Note that for even number diffraction orders, output coupling does not occur when the grating width a and grating separation b are equal.

Once the phase matching condition is satisfied, a radiation decay factor α can be determined, which is primarily influenced by the index profile of the waveguide and the grating depth. The depth of the gratings 68 is indicated by the index numeral 70 on FIG. 3, and there exists a saturation grating depth, $h_c$, over which the radiation decay factor becomes saturated. Since a high efficiency output coupling is desired, achieving a saturated grating depth is preferred. This grating coupler design is known in the art.

The index of refraction "ng" of the gratings 68 can be varied, but it is preferred that the gratings 68 be made of the same SiON material of waveguide 46, thereby having an index of refraction n2. The under buffer 40 preferably comprises $SiO_2$, having an index of refraction n3. Grating output couplers 38 are preferably integrated onto channel waveguides 46, such that the grating output coupler does not need any special alignment requirements and shows high stability compared to other output couplers.

The grating output coupler 38 preferably is designed to have an equal groove width and separation distance to avoid second-order diffraction effects. For a preferred output coupling angle, θ—designated by index numeral 54, to air 50 (having in index of refraction "n1") of 80°, the grating period, Λ, is 0.99 μm. The saturation etching depth, $h_c$, is 0.28 μm leading to the radiation decaying factor α=0.00205 μm$^{-1}$ with a grating index, $n_g$, is 1.55. The grating coupling length, designated by the index numeral 58, for 80% output power is 392 μm. It is preferred that the distance between the end of vertical directional coupler 36 and the beginning of grating output coupler 38, designated by the dimension 60 on FIG. 3, be approximately 100 μm, but this dimension is not critical.

Some example specifications for an exemplary SiON design are tabulated below:

| Channel waveguide: | |
|---|---|
| Type of waveguide | 4 layer with thin overlay |
| Upper buffer thickness | 0.3 μm |
| Waveguide thickness at channel | 0.6 μm |
| Waveguide thickness out of channel | 0.48 μm |
| Under buffer thickness | 5.0 μm |
| Channel width | 4.0 μm |
| Grating coupler: | |
| Output coupling angle, θ | 80 degree |
| Grating period, Λ | 0.99 μm |
| Grating index | 1.55 |
| Grating depth | 0.28 μm |
| Radiation decaying factor. α | 0.00205 μm$^{-1}$ |
| Grating length for 80% power | 392 μm |
| 3 dB directional coupler: | |
| Channel separation, S | 4.0 μm |
| Channel width, W | 4.0 μm |
| Bending radius, R | 3026 μm |
| Coupling length, L | 1022.2 μm |
| Coupler bending loss | Less than 0.01 dB |

The output grating coupler 38 is designed to have equal groove and space widths, as for the SiON design. For an 80° output coupling to air, the grating period, Λ, is 0.99 μm. The saturation etching depth, $h_c$, is 0.27 μm, giving a radiation decaying factor α=0.000047 μm$^{-1}$ for a grating index, $n_g$, of 1.48. Note that the radiation decay factor for silica waveguide is much smaller than before, leading here to a grating coupling length for 80% output power of 17,057 μm. Unfortunately a more satisfactory 400 μm grating coupling length only permits 3.69% of the optical energy to the coupled out which is far too small for practical use.

Some example specifications for an exemplary Silica glass design are tabulated below:

| Channel waveguide: | |
|---|---|
| Type of waveguide | Buried core with thin overlay |
| Upper buffer thickness | 0.1 μm |
| Waveguide thickness at channel | 3.0 μm |
| Under buffer thickness | 5.0 μm |
| Channel width | 2.5 μm |
| Grating coupler: | |
| Output coupling angle, θ | 80 degree |
| Grating period, Λ | 0.99 μm |
| Grating index | 1.48 |
| Grating depth | 0.27 μm |
| Radiation decaying factor. α | 0.000047 μm$^{-1}$ |
| Grating length for 80% power | 17,057 μm |
| 3 dB directional coupler | |
| Channel separation, S | 4.0 μm |
| Channel width, W | 2.5 μm |
| Bending radius, R | 2000 μm |
| Coupling length, L | 1208 μm |
| Coupler bending loss | Less than 0.01 dB |

The optical signal from the grating coupler 38 is transformed into an electrical signal to drive the circuitry inside the individual integrated circuits 26. The photodetector 86, amplifiers, filter and signal regeneration circuits (not shown) in the receiver converts the optical signal 32 (see FIG. 6) into an electrical signal with sufficient current drive and voltage swing for the clock input circuits of the integrated circuits, and with minimum loss of information. Typical photodetectors are PIN, MSM, avalanche photodiodes or phototransistors. The MSM, PIN and avalanche photodiode detectors have highly desirable characteristics for opto-electronic IC design. The receiver circuitry preferably consists of a detector, a low-noise amplifier, a high-gain amplifier, a filter and a signal regenerator, and the front-end amplifier in the receiver circuit is designed to be high-impedance or a transimpedance circuit to obtain a good tradeoff among sensitivity, bandwidth, dynamic range, linearity, and power consumption.

Figure 6:
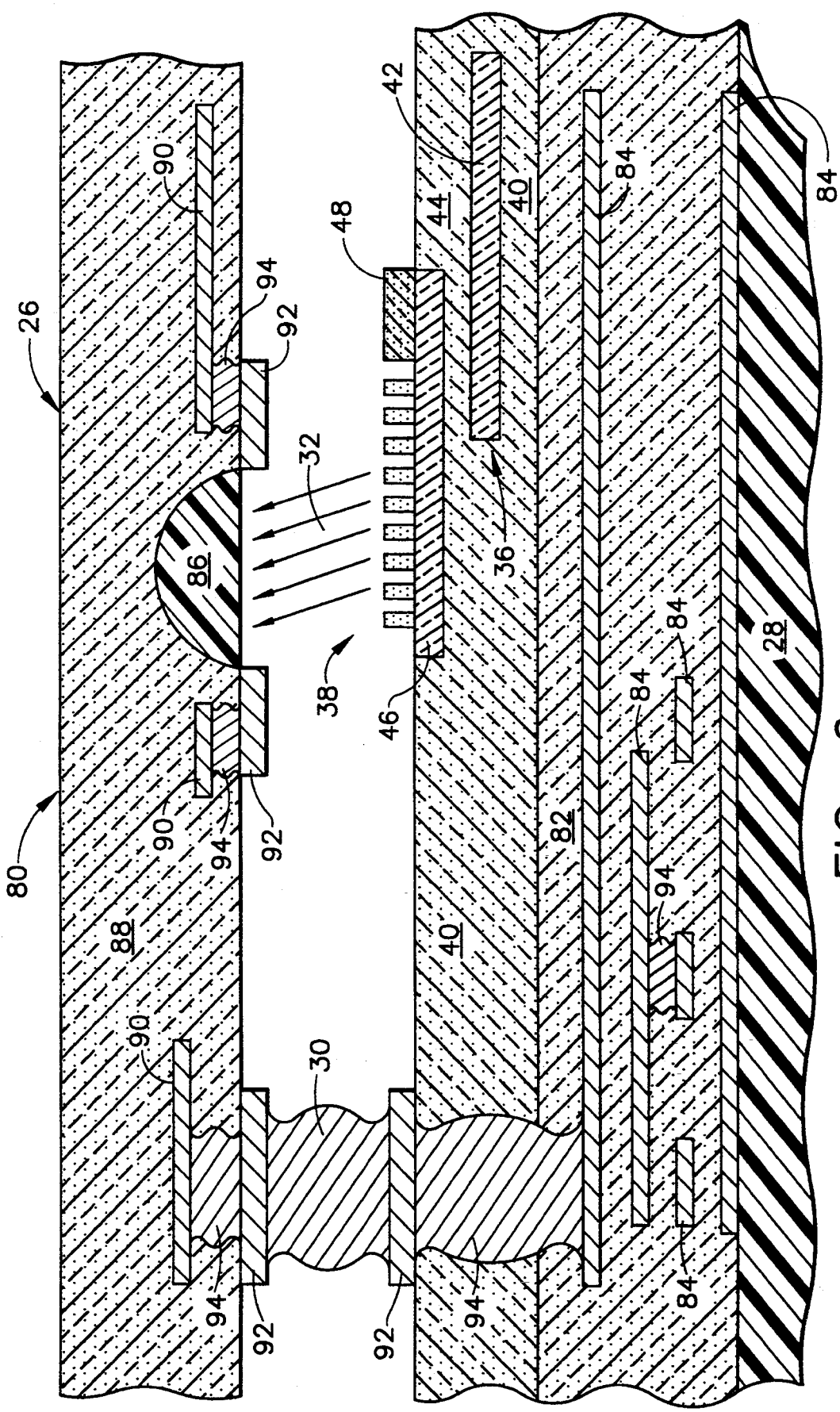
FIG. 6 is a side elevational view of a portion of the optical network of FIG. 1, showing the details of the integration of an optical waveguide constructed on top of multiple electrical interconnection layers, and including a detector integrated circuit mounted above the multichip module.

There are several approaches to implement an optical waveguide clock distribution network that are compatible with the multiple electrical signal interconnection layers on an MCM. One approach is to build an optical waveguide on top of the electrical signal layers such that the metal layers are not excessively disturbed during the optical waveguide fabrication processes, thereby constructing an integrated opto-electronic MCM 80, as depicted in FIG. 6. A high temperature electrically-conductive metal such as tungsten would be required for the electrical conductors 84, and could be utilized in the structure depicted in FIG. 6. In addition, the dielectric material 82 and substrate 28 must also be able to withstand high temperatures utilized during the fabrication process of the optical waveguides 42 and 44.

This configuration also eases the fabrication of the grating couplers 38 that direct the optical signals to detectors 86 mounted on the integrated circuits 26 (which are permanently bonded to the MCM 20). Bonding to the electrical interconnection pads 92 requires vertical conductive contacts 94 etched through the optical layer (buffer 40) to the top metal layer 84.

Figure 7:
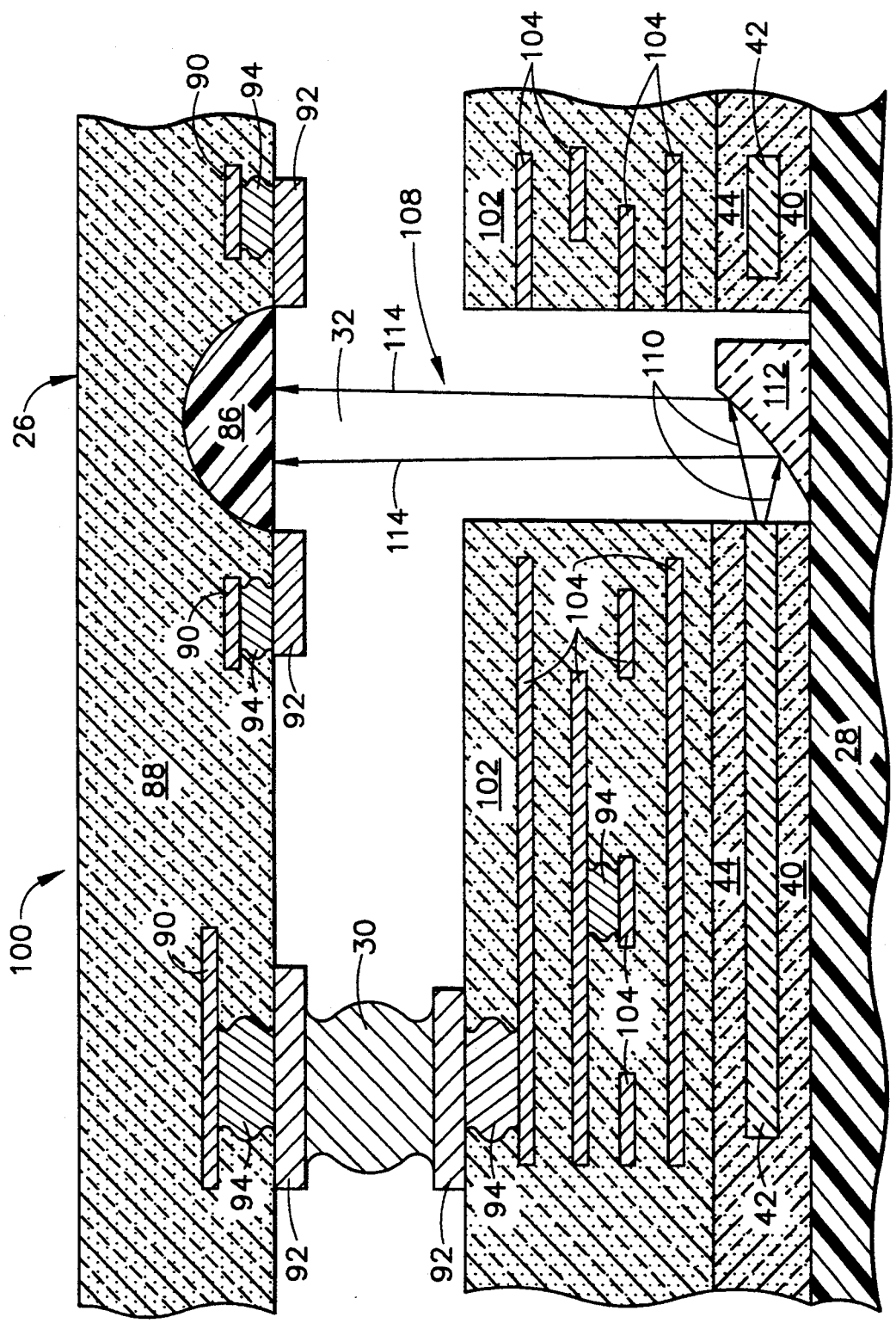
FIG. 7 is a side elevational view of the portion of the optical network of FIG. 1, showing the details of the integration of an optical waveguide constructed beneath multiple electrical interconnection layers, also showing a detector integrated circuit mounted above the multichip module.

An alternative approach is to fabricate the electrical signal layers on top of the optical waveguide, as depicted in FIG. 7, thereby constructing an integrated opto-electronic MCM 100. This MCM structure permits the use of commonly-used metals such as aluminum or copper for the electrically-conductive paths 104, along with standard multilayer fabrication methods, including a standard dielectric layer 102. A grating output coupler 38 would be quite difficult to fabricate in this case, so a preferred method would be to use a micro-mirror output coupler 112 manually placed at the optical network ends (i.e., the "termination points") after both the optical waveguide 42 and electrical layers 104 are fabricated. This approach may cause additional packaging overhead of mounting discrete elements (mirrors) on the MCM 20 but it results in a coupling efficiency that is higher than the grating coupling method. Cost, stability, ease of fabrication, reproducibility, testability and compatibility with an existing packaging procedure should be carefully considered before choosing any particular approach.

Since the optical output signal is directed along the length of waveguide 42 and continues out it waveguide's end, a light path 110 is created that strikes a micro-mirror 112 which redirects the light path 110 into a new path through an air gap 32 that follows a vertical path 114, thereby creating an optical output 108. The micro-mirror 112 preferably is slightly concave to focus a tighter spot upon photodetector 86. The other features of integrated opto-electronic MCM 100 are very similar to those of integrated opto-electronic MCM 80.

While it is preferred to use an completely symmetrical H-tree in constructing the waveguide segments 24 upon MCM 20, that can only occur where each of the ICs 26 has its optical input at a location that allows such ICs 26 to be oriented in a periodic array. In such a circumstance, each of the optical paths within optical clock network 10 can truly be of equal length.

Figure 8:
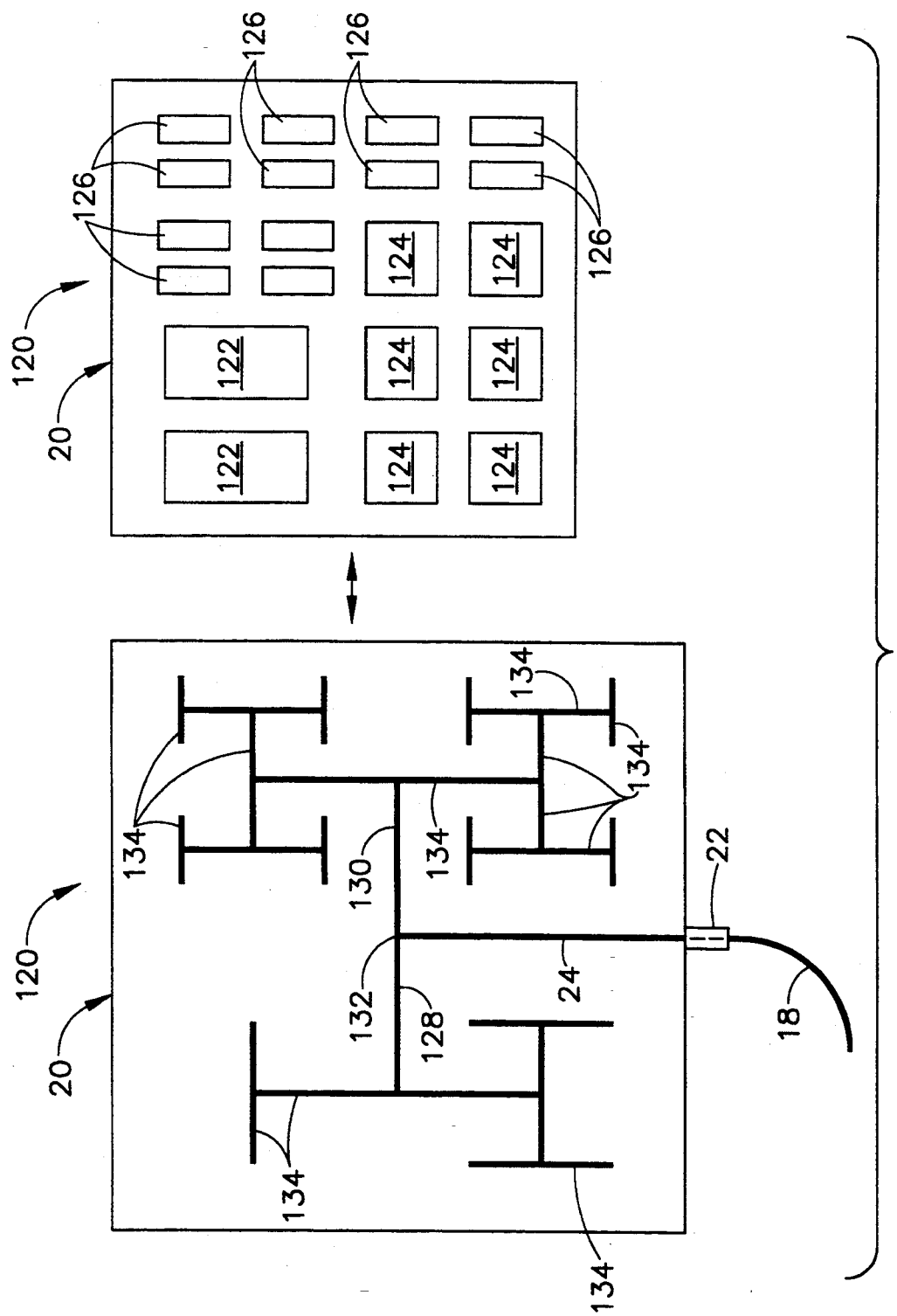
FIG. 8 is a diagrammatic view of an unbalanced H-tree distribution network having integrated circuits of various sizes that are placed upon a multichip module in a similar manner to that of FIG. 1.

In general, the ICs 26 on an MCM 20 have different sizes and are usually placed on the MCM to satisfy constraints other than clock distribution, such as signal interconnection minimization, thermal gradient minimization or other functional and physical goals. Since the preferred H-tree network 10 is a balanced symmetric network, placing ICs with different sizes on the various MCM positions imposes variations from this regular structure, and thus requires adjustments to the electrical transmission line design and optical waveguide design. In the example optical clock network 120 depicted in FIG. 8, two large ICs 122 and four medium size ICs 124 are placed on the left half plane of the MCM 20, and two medium ICs 124 and twelve small size ICs 126 are placed on the right half of MCM 20. Regardless of the IC sizes and positions, each of the optical receiving components of those ICs should have same the signal power and source-to-destination path length. However an unbalanced signal power division at some branching points now occurs and the interconnection lengths must be adjusted for the left half plane of MCM.

It will be understood that the interconnection length adjustment can be done by lengthening some of the signal interconnection paths for either electrical or optical unbalanced H-tree networks. The necessary unequal power division for the optical network can be accomplished solely by adjusting the coupling lengths of the directional couplers (in other words, 3 dB directional couplers would not be used at every location that a branching occurs within the optical waveguide). An alternative power division method could also be accomplished using Y branching. However such a design is quite complex since it requires a detailed modification of the electric field profiles for different nodes at the branching points. Thus, it is preferred to use the directional coupler approach. There would be no significant performance degradation of the unbalanced optical H-tree networks. The optical clock signal integrity at receiving circuitry at different sub-blocks depends primarily on the input power, and the unequal branching does not effect the signal quality of the received clock signals once careful branching is done.

For optical clock network 120, since there are six (6) ICs 122 and 124 on the left half of MCM 20, and fourteen (14) ICs 124 and 126 on its right half, an unequal directional coupler 132 should be located at the downstream end of the "root" optical waveguide 24. Directional coupler 132 is designed to preferably send 30% of the optical power into optical waveguide 128 (which supplies the optical signal to six (6) of the twenty (20) ICs mounted on MCM 20), and 70% of the optical power into optical waveguide 130 (which supplies the optical signal to fourteen (14) of the twenty (20) ICs mounted on MCM 20). The waveguide segments 134 that are further downstream from segments 128 and 130 should be designed so that each IC 122, 124, or 26 receives an equal amount of optical power, which constrains some of the branching directional couplers further downstream to be balanced 3 dB directional couplers, and others to be unbalanced.

The unequal power division for an electrical H-tree networks requires some modification of the characteristic impedances of the network. At each of the branching points of the H-tree network, different characteristic impedances should be assigned to different branches depending on the number of nodes that the branches have to support. However there are significant side effects for the unbalanced electrical H-tree network. Different characteristic impedances imply different loadings for different branches, since electrical wires contribute to the load unlike optical interconnections. The clock signals will experience different loads for interconnection paths and, thus, controlling the transient responses for different subblocks is quite difficult. SPICE simulation of several unbalanced electrical H-tree networks illustrates these effects, where the varying transient responses contribute to a significant clock skew (from 53 to 59 ps clock skews). As a result, the optical H-tree is much more suitable for unbalanced H-trees which support more flexible placement of ICs on MCMs.

A design example of an electrical 16 node H-tree with one level of unmatched branches is provided in the table below:

| Design specification: | |
|---|---|
| MCM size | 8 × 8 cm² |
| Number of node | 16 |
| Dielectric material | SiO₂ (εr = 3.7) |
| Metal material | Al (ρ = 2.8 μΩ-cm) |
| Aspect ratio (a = t/h) | 1.5 |
| Target impedance at end node | 50 Ω |
| Metal thickness for first incident switching (h) | 5 μm |
| 0th line parameters for Z0: | |
| Node length | 4.0 cm |
| Wire width/thickness ratio | 36 |
| Line capacitance | 10.41 pF/cm |
| Line resistance | 0.31 Ω |
| Line impedance | 6.32 Ω |
| 1st line parameters for Z1: | |
| Node length | 2.0 cm |
| Wire width/thickness ratio | 17 |
| Line capacitance | 5.38 pF/cm |
| Line resistance | 0.66 Ω |
| Line impedance | 12.23 Ω |
| 2nd line parameters for Z2: | |
| Node length | 2.0 cm |
| Wire width/thickness ratio | 7 |
| Line capacitance | 2.74 pF/cm |
| Line resistance | 1.6 Ω |
| Line impedance | 24.05 Ω |
| 3rd line parameters for Z3: | |
| Node length | 1.0 cm |
| Wire width/thickness ratio | 2.0 |
| Line capacitance | 1.41 pF/cm |
| Line resistance | 5.60 Ω |
| Line impedance | 46.58 Ω |
| 4th line parameters for Z4: | |
| Node length | 1.0 cm |
| Wire width/thickness ratio | 2.0 |
| Line capacitance | 1.41 pF/cm |
| Line resistance | 5.6 Ω |
| Line impedance | 46.58 Ω |

The system performance of the three waveguide structures described hereinabove can be addressed in terms of bandwidth budget and power budget analysis. Using an optical fiber of the type 3/125 single-mode step-index fiber, and the following component parameters:

| (1) Specifications for the laser diode: | |
|---|---|
| Type | Single-mode laser diode |
| Operation wavelength | 1.3 μm |
| Spectral width | less than 0.2 nm |
| Peak-to-peak power | 20 mW = 10 dBm |
| Rise time ( = fall time) | 0.2 ns |
| Modulation method | Direct modulation |
| (2) Specifications for the receiver system: | |
| Type of photodiode | InGaAs APD photodiode |
| Type of front-end amplifier | High-impedance amplifier |
| Detection wavelength | 1.3 μm |
| Detection area | 20 μm by 400 μm |
| Detector rise time ( = fall time) | 0.5 ns |
| Responsivity | 0.9 A/W |
| Sensitivity | −20 dBm with BER = $10^{-17}$ at 500 MHz operation |

Typically the clock rise time at the output of the detector amplifier system, $t_S$, should be less than 70% of the pulse duration. Assuming a 500 MHz return-to-zero signal, the system rise time is 0.7 ns:

The rise times of the light source $t_{LS}$, waveguide $t_M$ and photodetector $t_{PD}$ are related to the system rise time $t_S$ by the equation:

$$t_S^2 = t_{LS}^2 + t_M^2 + t_{PD}^2$$

The photodetector rise time is a function of the carrier transit time $t_{TRAN}$ and RC time constant $t_{RC}$ of the amplifier circuitry, where C and R are photodiode capacitance and bias-resistance.

The waveguide rise time is affected by pulse spreading caused by modal distortion and dispersion (both material and waveguide). Since a single-mode fiber and waveguide is used, there is no modal distortion. Since the fiber and channel waveguides are made from nearly the same material and have similar structures, the dispersion values of fiber and waveguide are assumed to be equal. Using the typical material and waveguide dispersion values of optical fibers at 1.3 μm, the waveguide rise time, $t_M$, is calculated as being in the fentosecond range (e.g., 0.8 fsec), giving a bandwidth of the optical clock distribution network estimated in the tera-Hertz range. The bandwidth of the optical clock distribution network is primarily limited by transmitter and receiver, not by the optical network. For practical applications, it appears feasible to use a direct modulation method for the signal transmitter to realize a system clock distribution to at least 2 GHz and greater.

The waveguide rise time, $t_M$, is insignificant and the optical interconnection bandwidths are generally limited by light source and detector bandwidths. The contributions of light source and photodetector rise time are less than the system rise time and this system satisfies the bandwidth requirement. The clock skew is caused by different interconnection paths for different ICs. The estimated clock skew of the present H-tree configuration would be the difference of the receiver rise time between different IC sites, $\Delta t_{PD}$, to give insignificant clock skew. Since the same light source and photodetectors are used for the three H-tree network designs described above, the above analysis applies to the three designs equally.

The power loss of the system can be caused by laser-to-fiber coupling, fiber propagation loss, fiber-to-waveguide coupling, waveguide propagation loss, 3 dB directional coupler loss, grating coupler loss and vertical coupler loss. The laser-to-fiber coupling loss can be minimized by the aid of a GRIN lens and is approximately to be 2 dB. The optical fiber propagation loss is negligible since typical propagation loss value for optical fibers is less than 1 dB/km. The fiber-to-waveguide coupling loss depends on numerical aperture, field profile match and fiber-to waveguide alignment. This loss is mostly influenced by the size mismatch between the fiber and waveguide. The 3 dB directional coupler loss depends on the index profiles and geometrical structures of channel waveguides. The waveguide propagation loss depends on the type of waveguide material and structure. The hologram coupler efficiency is determined by index profiles, geometrical structures of waveguide, grating period, grating depth, grating material and length of grating. Finally, vertical coupler loss is influenced by the propagation constant mismatch between two waveguide structures and coupler length. The summary of a power budget analysis for the three designs is listed in tabular form below.

| System parameter | SiON design | Silica glass design | Hybrid design |
|---|---|---|---|
| Average laser power | 10 dBm | 10 dBm | 10 dBm |
| Source coupling loss | −3 dB | −3 dB | −3 dB |
| Fiber attenuation | 0 dB | 0 dB | 0 dB |
| Fiber-to-waveguide coupling loss | −9 dB | −1 dB | −1 dB |
| Waveguide attenuation | −3 dB | −1 dB | −1 dB |
| 3 dB coupler loss (four) | −16 dB | −13 dB | −13 dB |
| Grating couple loss | −4 dB | Larger than −25 dB | −4 dB |
| Vertical coupler loss | — | — | −2 dB |
| Total loss | −35 dB | Larger than −43 dB | −22 dB |
| Power available at receiver | −25 dBm | −33 dBm | −12 dBm |
| Receiver sensitivity | −20 dB | −20 dBm | −20 dBm |
| Loss margin | −5 dB | −13 dB | +8 dB |

The power loss of the optical clock distribution network is shown in the above table for typical requirements of a 500 MHz clock with 50% duty cycle, 10% of the clock period maximum skew, and a bit error rate (BER) of $10^{-17}$. The MCM configuration is assumed to be an $8 \times 8$ cm$^2$ MCM with 16 clocked integrated circuits. The laser wavelength is 1.3 μm, its spectral width less than 0.2 nm, and its risetime 0.2 ns. The detectors are preferably inGaAs AD photodiodes with a detection area of 20 μm $\times$ 400 μm, risetime/falltime of 0.5 ns, and sensitivity of −20 dBm at 500 MHz. In this configuration, the hybrid design easily meets the design goals, assuming a 6 dB margin, while the single material waveguide designs do not.

Since a 6 dB margin or better is generally needed (to account for the various degradation factors, such as power rail degradation, laser diode end-of-life margin and additional power to compensate unequal power distributions at different H-tree nodes), the hybrid design more than satisfies the power requirements while the other two approaches fall short. The SiON-based design has large power loss due to the thin waveguide structure which contributes to large fiber-to-waveguide coupling loss. The silica based design falls short of the power budget requirements due to large grating coupler loss. It is evident that this design needs a different type of output coupler. The hybrid design has the most favorable power budget and easily meets the system requirements.

Optical clock distribution networks based on both silicon oxy-nitride and silica glass can be readily designed and each approach has distinct advantages over the other. For example, the SiON waveguide network with design values given hereinabove for a 16-node H-tree has a source to detector signal loss of about −35 dB, while the silica class waveguide network with design values given hereinabove has a signal loss of over −43 dB. A significant fraction of the SiON loss is due to high fiber-to-waveguide source end coupling (−9 dB) while grating coupler losses of over −25 dB account for a significant fraction of the silica glass loss.

It is preferred to implement the optical clock distribution network of the present invention by use of a hybrid system where the best features of both the silicon oxy-nitride and silica glass waveguides are used shows a signal loss of only −22 dB. In this case, silica glass is used as the propagation medium and SiON is used to couple to the grating coupler at the receiver end of the network. Since single mode silica glass waveguides are considerably thicker than single mode SiON waveguides, fiber-to-waveguide losses are much smaller.

The H-tree network power consumption, network bandwidth and maximum number of fanout nodes on a MCM are the key parameters of design interests. A comparison of the performance of electrical and optical networks shows the superiority of optical clock distribution networks, particularly at higher frequencies.

The table below shows a comparison between electrical and optical H-tree networks on an $8 \times 8$ cm$^2$ silicon MCM. The electrical H-tree has one level of unmatched branching and the optical H-tree is based on the SiON/-silica glass hybrid implementation with a grating output coupler or silica glass implementation with a micro-mirror coupler. The switching energy calculation is based a power consumption model of electrical and optical interconnections. The optical switching energy is estimated by using values of −3 dB, −6 to −10 dB and −2 to −3 dB for laser diode, signal propagation/distribution network and photodetector efficiencies respectively. Note that the system bandwidth of the electrical H-tree is limited by the transmission line network bandwidth whereas the optical H-tree system bandwidth is limited by driver and receiver bandwidths. The number of nodes supported by optical networks primarily depends on a driver output power and a receiver sensitivity. It can easily reach 64 nodes at the frequency ranges of multi GHz using currently available photonic devices.

| Performance attributes | Electrical H-tree | Optical H-tree |
|---|---|---|
| Switching energy | 2200–6300 pJ | 1600–6200 pJ |
| System bandwidth | Less than 300 MHz | Less than 2 GHz |
| Number of nodes supported | Less than 16 | More than 16 |

It will be understood that the majority of the switching energy of the electrical clock distribution system is consumed by the electrical H-tree network itself, thereby increasing the MCM's required thermal dissipation. On the other hand, the switching energy of the optical clock distribution system is consumed by the optical signal source and driver, which does not increase the thermal dissipation requirement of its MCM.

Figure 9:
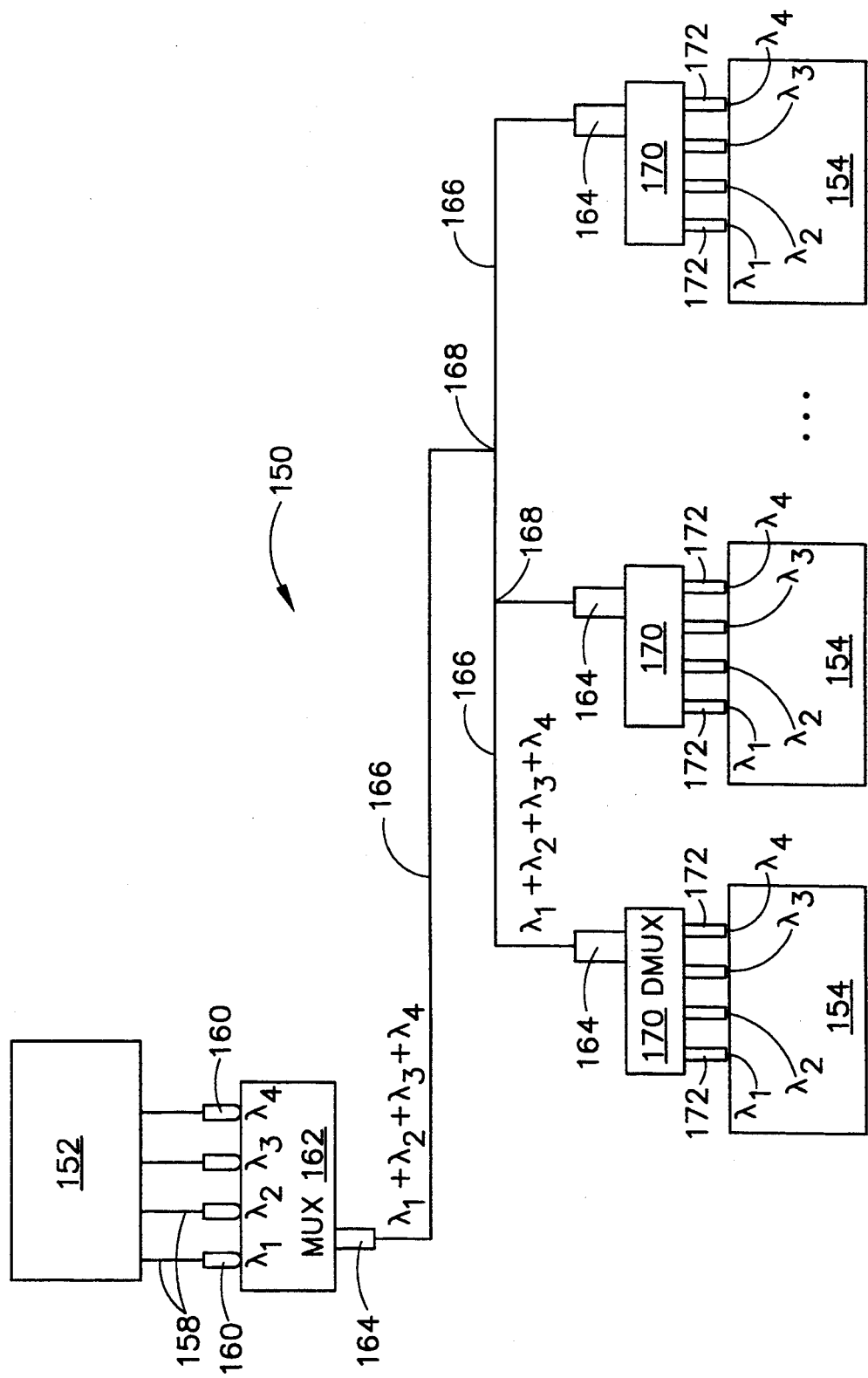
FIG. 9 is a block diagram of a multi-wavelength communication network that uses optical waveguides that transfer optical signals from an optical multiplexer to optical demultiplexers, all of which is mounted upon a multichip module and constructed according to the principles of the present invention.

FIG. 9 shows another use of the technology described hereinabove as a communications network, generally designated by the index numeral 150, that transmits multiple optical signals at different wavelengths simultaneously down the waveguide without interference between signals. Multi-wavelength communications network 150 is preferably mounted upon a multichip module that has various integrated circuits, including several microprocessor integrated circuits.

One of the integrated circuits on the MCM produces signals that are to be transmitted to other ICs on the multichip carrier, and this transmitting IC, designated 152, has electrical outputs that are placed upon electrical conductors 158. Each of these electrical signals is directed into a laser diode 160, which produces an optical output at a wavelength dependent upon the particular laser diode chosen for that circuit. The optical output of each laser diode 160 is then directed through a GRIN lens and into an optical multiplexer 162, which combines each of its input optical signals into a single optical output signal (thereby performing wavelength division multiplexing). To avoid interference between signals, each of the laser diodes 160 transmits light at a different optical wavelength from any of the other laser diodes 160, thereby creating a multiple wavelength optical signal at the output of optical multiplexer 162.

The output of optical multiplexer 162 is directed into a butt connector 164, which further directs the optical signal into a single mode optical waveguide, generally designated by the index numeral 166. Optical waveguide 166 is run through various points upon the multichip module, and at the intersections within the network made up by optical waveguide 166, Y couplers 168 are required to properly distribute the optical signals. Directional couplers cannot be used to distribute the multiple wavelength optical signals, since their design is wavelength dependent (and they can, therefore, only work with single wavelength optical signals).

The optical signals are transmitted through optical waveguide 166 until reaching the vicinity of an integrated circuit that is to receive information being transmitted along the network 150. Each receiver circuit, designated by the index numeral 154, includes electronics that convert optical signals to electrical signals. Before such optical signals reach the receiver IC 154, optical waveguide 166 must interface through another butt connector 162 into the input of an optical demultiplexer 170. Once the optical signals enter demultiplexer 170, they are split out according to their wavelength and output from the demultiplexer through a lens/coupler 172 (thereby performing wavelength division demultiplexing). These optical signals are then further directed into photodetectors mounted upon the receiver IC 154.

The advantages of the multi-wavelength communication network are numerous, in that very high speed data can be transmitted with very low cross talk between such signals and with very low skew or other error-introducing phenomena affecting the system operation. In addition, the clock signals that synchronize all of the integrated circuits on the multichip module can also be introduced along the same optical network, and could be merely one of the many signals transmitted by the transmitter IC 152 into all of the other ICs that require the clock signal. Other advantages of the multi-wavelength communication network include providing essential multiprocessing mechanisms (such as "coherent cache" and "process synchronization" mechanisms) that are easy to construct.

Figure 10:
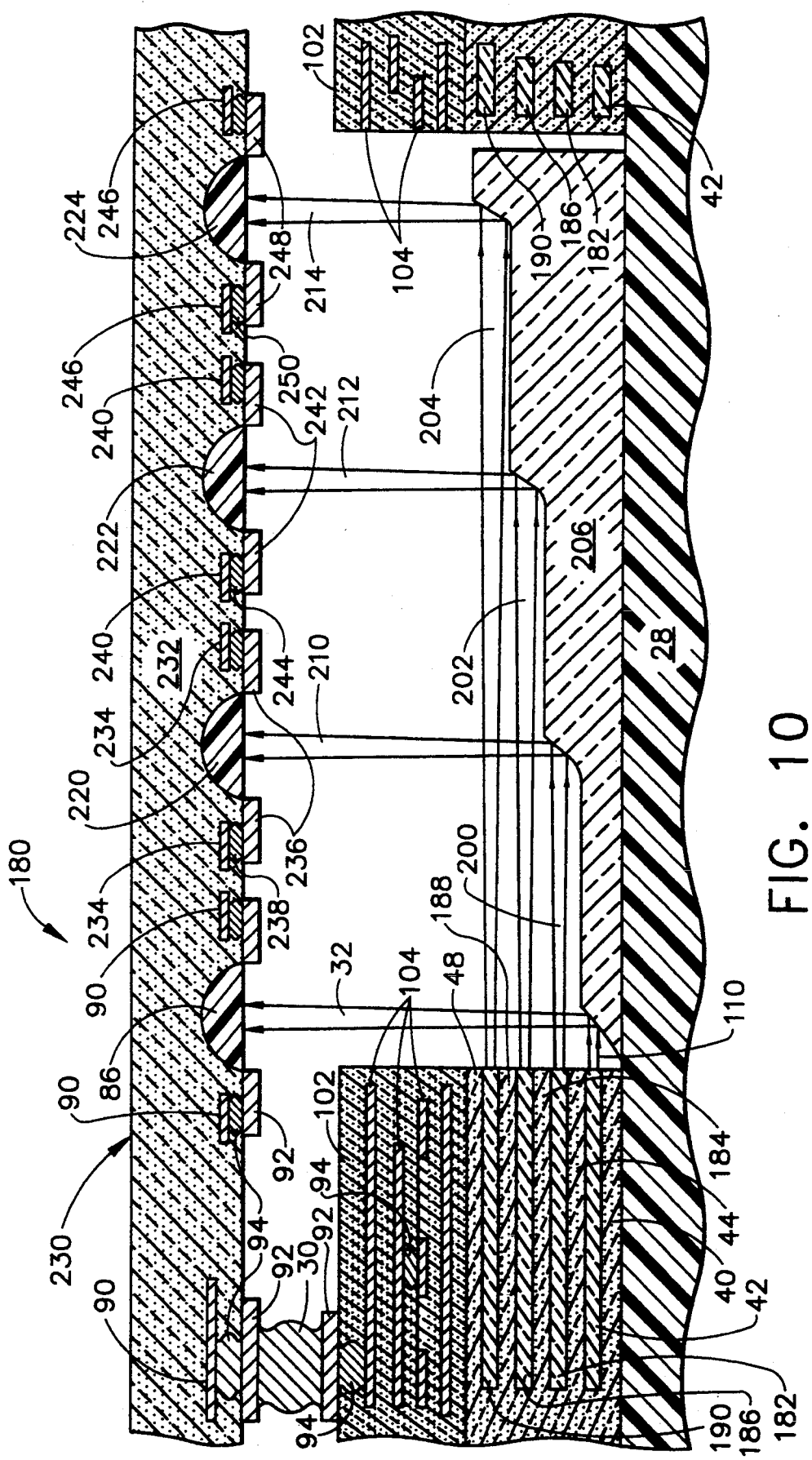
FIG. 10 is a side elevational view of a portion of the optical network of FIG. 1 in which multiple layers of waveguides are constructed beneath multiple electrical interconnection layers, and a multi-stage micro-mirror directs optical signals to multiple photodetectors in an integrated circuit mounted above the multichip module.

FIG. 10 shows another embodiment of the optical clock network of the present invention in which multiple layers of waveguides are constructed within the multichip module. This multi-layer waveguide network, generally designated by the index numeral 180, has four optical waveguides 42, 182, 186, and 190 that are preferably mounted on top of one another in a vertical line, and are preferably constructed of silica glass. These optical waveguides are mounted just above the substrate 28 of MCM 20, and are surrounded by layers of buffer material, preferably constructed of $SiO_2$, these layers separating each of the waveguides and designated by the index numerals 40, 44, 184, 188, and 48. These optical waveguides are mounted beneath the electrical interconnections of the MCM, which consist of a top dielectric layer 102 having multiple layers of electrical conductors 104. As in the integrated optoelectronic MCM 100 depicted in FIG. 7, electrical interconnections are made between the MCM and the integrated circuit mounted above by use of electrical connection 30, bonding pads 92, and vertical electrical conductors 94. Once these electrical signals are passed into the IC 230, they can run throughout IC 230 along electrical conductor paths 90.

Integrated circuit 230 includes multiple optical inputs that each comprise a depletion region, generally designated by the index numerals 86, 220, 222, and 224. As optical signals exit from the four vertical layers of waveguides 42, 182, 186, and 190, they exit along light paths 110, 200, 202, and 204, respectively. Each of these light paths impact against a multi-stage micro-mirror 206, which redirects each of these optical paths approximately 90°, thereby creating new optical paths 32, 210, 212, and 214 through respective air gaps. As can be seen on FIG. 10, multi-stage micro-mirror 206 has four tiers that each include a somewhat concave mirror that tends to focus each of tile vertical air gap light paths 32, 210, 212, and 214 onto a small region of their respective photodetectors 86, 220, 222, and 224.

Each of these photodetectors comprises a depletion region within a dielectric layer 232 of the integrated circuit 230. Each of the photodetectors includes a bonding pad 92, 236, 242, and 248, respectively, which have approximately annular shapes. These bonding pads are electrically connected to conductors 90, 234, 240, and 246, respectively, within the dielectric layer 232 of IC 230, by use of vertical electrical conductors 94, 238, 244, and 250, respectively.

Since each of the optical waveguides 42, 182, 186, and 190 are capable of transmitting high-speed signals with low skew, the transmission of parallel data signals is easily accomplished by use of multi-layer waveguide network 180. In the illustrated example of FIG. 10, using single wavelength light in each of these waveguides, tour high speed data bits can be transmitted from the laser diodes (not shown) simultaneously and are received by their respective photodetectors virtually simultaneously on IC 230. The only difference in path length of these four signal paths is the longer distance of some of the horizontal light paths 110, 200, 202, and 204 before they impact the multi-stage micro-mirror 206. These distances will be very small (and their effect will be negligible), and will be somewhat equalized by the unequal vertical light path distances between light paths 32, 210, 212, and 214 through the air gaps.

It will be understood that communication network 150 will operate such that asynchronous input data will be output (to IC 230) as asynchronous data, and that synchronous input data will be output (to IC 230) as synchronous data. It will be also understood that the distances between photodiodes 86, 220, 222, and 224 could be made nearly equal to the distances between waveguides 42, 182, 186, and 190. In such circumstances, micro-mirror 206 could be constructed as one nearly flat surface, at a 45° angle, and the length of each of the light paths through air would be nearly equal.

Rather than using single wavelength light through the waveguides, a multiple wavelength light signal could be transmitted through each of these waveguides by use of an optical multiplexer (such as multi-wavelength multiplexer 162) at the laser diode location for each of these waveguides, and by use of an optical demultiplexer similar to multi-wavelength demultiplexer 170 located at each of the photodetectors 86, 220, 222, and 224. If, e.g., each optical waveguide 42, 182, 186, and 190 contains four different optical signals, then sixteen (16) bits of high-speed data can be synchronously transmitted throughout the multi-layer waveguide network 180. By use of these sixteen (16) bits, computer data and instructions can be readily transmitted throughout the network.

Even wider data-bit information could be transmitted over multi-layer waveguide network 180 by use of either more optical waveguides, or by use of a greater number of different wavelengths being transmitted through each of the optical waveguides. It has been demonstrated that multiple laser diodes of different output optical wavelengths can be constructed on the same substrate with a very small wavelength separation between each of those optical wavelengths. Using a ten wavelength multiplexer and demultiplexer, the four-layer waveguide network 180 illustrated in FIG. 10 could transmit forty (40) bits of synchronous data. It will be understood that asynchronous data could also be transmitted through the four-layer waveguide network 180; i.e., the asynchronous data would not be related to any single reference signal.

Figure 11:
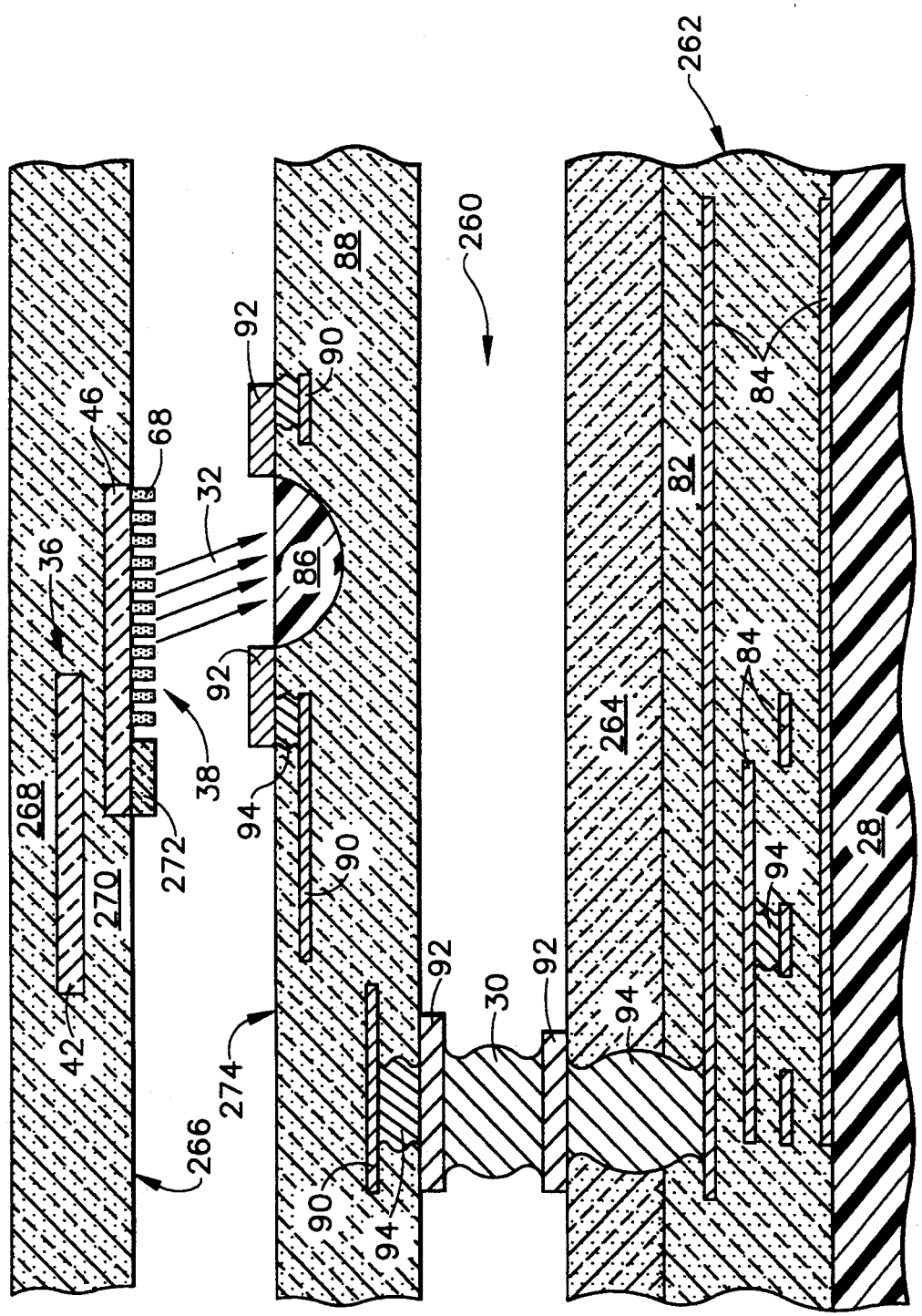
FIG. 11 is a side elevational view of a portion of an optical waveguide similar to the network of FIG. 1, in which a separate optical module is mounted above the multichip module and its associated integrated circuits, wherein the optical signals running throughout the optical waveguide are transmitted from a vertical directional coupler having a grating output coupler vertically downward and onto a photodetector located upon the integrated circuit.

FIG. 11 depicts another alternative embodiment, generally designated by the index numeral 260, in which tile MCM carries purely electrical signals and a separate optical module is mounted above the electrical MCM.

The electrical MCM, designated by the index numeral 262, includes a substrate 28, dielectric layer 82, and multiple layers of electrical conductors 84, some having vertical interconnections by use of vias (vertical electrical conductors) 94. Another dielectric layer 264 that would normally contain the optical waveguide of an integrated opto-electronic MCM (as depicted by index numeral 80 in FIG. 6) could be eliminated if it was not desirable to maintain the same thickness between various types of MCMs.

An integrated circuit 274 having an optical input is mounted above electrical MCM 262, in a similar manner to that of IC 26 being mounted above the opto-electronic MCM 20, depicted in FIG. 6. In IC 274, however, the optical input is located on the top surface of IC 274, rather than on its bottom surface. Integrated circuit 274 still has electrically conducting paths 90, in some cases connected to the electrical MCM 262 through electrical connection 30, bonding pads 92, and vertical electrical conductor 94. In addition, other electrical conductors 90 within the dielectric 88 of IC 274 are connected to the optical input device, which comprises a photodetector 86, bonding pad 92, and vertical electrical conductor 94.

An optical module 266 is mounted above all of the integrated circuits such as IC 274. Optical module 266 contains only optical waveguides, such as waveguide 42 preferably made of silica glass. In addition, buffer layers 268, 270, and 272 surround the optical waveguides 42 and 46, and these buffers are preferably made of $SiO_2$. It is preferred that the silica optical waveguide 42 have its optical signal transferred via a vertical directional coupler 36 to a second waveguide 46 made of SiON. After that signal transfer has been accomplished, it is then preferred to output the optical signal through an optical path air gap 32 by use of a grating assisted output coupler 38. By use of this grating output coupler, the light path impacts photodetector 86 upon IC 274.

One major advantage of the construction technique used in the separate optical module embodiment 260 is that the construction of the MCM is simplified because it contains only electrical components rather than both optical and electrical components. In addition, the optical module 266 can be made as a separate device, and its construction will not impact any of the electrical components involved, thereby eliminating the necessity of either using high-temperature electrical components or using micro-mirrors in the optical portion of such a system. The only drawback of the use of the separate optical module 266 is that alignment between the optical outputs from optical module 266 and the optical inputs of each of the ICs 274 will be somewhat more difficult to accomplish, since there are three overall layers of structure being integrated into one system. With proper mechanical tolerances, this alternate embodiment 260 should be readily achievable.

In conclusion, a feasible technology has been disclosed to distribute a global clock synchronously on an MCM with small skew. A hybrid (SiON/Silica glass) H-tree waveguide structure is provided with integrated input and output couplers on an MCM. An optical interconnection pattern of a H-tree network based on a hybrid (SiON/silica glass) approach equalizes source to detector interconnection distance for various IC sites on an MCM. This system is capable of providing a minimum 500 MHz synchronous global clock distribution capability for at least sixteen nodes in a distributed computer system environment, and can be extended to at least 64 nodes and 1 GHz clock frequency assuming qualified laser diode sources and photodiode receivers exist, since the system performance is not limited by the optical waveguide distribution network of the present invention. The optical H-tree clock distribution network of the present invention has a superior capability compared to an electrical network by providing large bandwidth, large fanout, small system switching energy and flexible network configuration. Thus an optical system clock distribution for multichip modules is preferred (and possibly, required) for a high speed, MCM-based and synchronous distributed multiprocessor computer system (DMCS), particularly above 300 MHz.

An H-tree configuration is exemplary for use in an optical clock distribution system. FIG. 1 shows a 16-node H-tree optical clock distribution network consisting of optical waveguides, 3 dB directional couplers, 90 degree smooth bending, and grating-assisted output couplers. Such a network can occupy up to an 8-cm × 8-cm silicon MCM. The waveguides can be either silicon oxy-nitride (SiON) or silica glass (Si). Both types of waveguides exhibit a signal loss of less than 0.1 to 0.3 dB/cm. The directional couplers are designed for equal power division with low excess loss, small overall size and uniform power distribution. The grating couplers are integrated directly on the channel waveguides.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A high-speed optical synchronous clock distribution system comprising:
   (a) a source of modulated electromagnetic energy, said source having a directed output;
   (b) an optical network having an input that receives electromagnetic energy from the directed output of said source of electromagnetic energy, said optical network including at least one integrated optical silicon-based waveguide into which said electromagnetic energy is directed from said input, said optical waveguide comprising a plurality of segments that each guide said electromagnetic energy until arriving at a termination point, each of said termination points comprising an optical output; and
   (c) a plurality of integrated circuits each having a photodetector that receives one of the optical outputs from the termination point of said optical waveguide segments, each of said plurality of integrated circuits being in synchronous communication with said source of electromagnetic energy at a high frequency clock rate.

2. The system as recited in claim 1, wherein said plurality of integrated circuits are mounted on a multichip module.

3. The system as recited in claim 2, wherein said multichip module comprises layers containing both electrical circuits and said at least one integrated optical silicon-based waveguide, and said at least one integrated optical silicon-based waveguide is located above the layers containing said electrical circuits.

4. The system as recited in claim 2, wherein said multichip module comprises layers containing both electrical circuits and said at least one integrated optical silicon-based waveguide, and said at least one integrated optical silicon-based waveguide is located beneath the layers containing said electrical circuits.

5. The system as recited in claim 1, wherein said optical network comprises a symmetrical H-tree.

6. The system as recited in claim 1, wherein said optical network comprises an asymmetrical H-tree.

7. The system as recited in claim 2, wherein said optical network comprises a symmetrical H-tree, and the locations of said photodetectors on said plurality of integrated circuits form a periodic array.

8. The system as recited in claim 2, wherein said optical network comprises an asymmetrical H-tree, and the locations of said photodetectors on said plurality of integrated circuits do not form a periodic array.

9. The system as recited in claim 1, wherein said at least one integrated optical silicon-based waveguide comprises silica glass.

10. The system as recited in claim 1, wherein said at least one integrated optical silicon-based waveguide comprises SiON.

11. The system as recited in claim 1, wherein said at least one integrated optical silicon-based waveguide comprises silica glass having at least one vertical direction coupler comprising SiON.

12. The system as recited in claim 1, wherein said at least one integrated optical silicon-based waveguide comprises an input segment that evolves into two intermediate segments of said plurality of segments by use of a directional coupler.

13. The system as recited in claim 1, wherein said at least one integrated optical silicon-based waveguide comprises an input segment that evolves into two intermediate segments of said plurality of segments by use of a Y-junction.

14. The system as recited in claim 1, wherein said optical output at each of said termination points comprises a grating output coupler.

15. The system as recited in claim 1, wherein said optical output at each of said termination points comprises a micro-mirror output coupler.

16. The system as recited in claim 1, wherein said source of electromagnetic energy comprises a laser that emits coherent single wavelength light.

17. The system as recited in claim 1, wherein said waveguide in a single-mode waveguide.

18. The system as recited in claim 2, further comprising a plurality of sources of modulated electromagnetic energy and an optical multiplexer located at said input to the optical network, and an optical demultiplexer located at each of the termination points of said plurality of segments.

19. The system as recited in claim 18, wherein each of said plurality of sources of modulated electromagnetic energy output single wavelength light of a different wavelength from one another and said optical network receives and guides multiple wavelength light.

20. The system as recited in claim 19, wherein each of said optical demultiplexers outputs a plurality of single wavelength light signals that correspond in wavelength to the outputs of said plurality of sources of modulated electromagnetic energy.

21. The system as recited in claim 20, wherein each of said plurality of single wavelength light output signals exhibits a low skew.

22. A high-speed optical synchronous clock distribution system comprising:
   (a) a source of modulated electromagnetic energy, said source having a directed output:
   (b) a separate optical structure that contains an optical network having an input that receives electromagnetic energy from the directed output of said source of electromagnetic energy, said optical network including at least one integrated optical silicon-based waveguide into which said electromagnetic energy is directed from said input, said optical waveguide comprising a plurality of segments that each guide said electromagnetic energy until arriving at a termination point, each of said termination points comprising an optical output; and
   (c) a plurality of integrated circuits each having a photodetector that receives one of the optical outputs from the termination point of said optical waveguide segments, each of said plurality of integrated circuits being in synchronous communication with said source of electromagnetic energy at a high frequency clock rate, said plurality of integrated circuits being mounted on a multichip module containing electrical circuits, said multichip module being aligned with said separate optical structure such that said optical outputs are directed onto the photodetector located on said integrated circuits.

23. A high-speed optical signal distribution system comprising:
   (a) a plurality of sources of modulated electromagnetic energy, each of said sources having a directed output;
   (b) a plurality of optical networks each having an input that receives electromagnetic energy from the directed output of one of said plurality of sources of electromagnetic energy, said plurality of optical networks including at least one integrated optical silicon-based waveguide into which said electromagnetic energy is directed from said input, each said optical waveguide comprising a plurality of segments that each guide said electromagnetic energy until arriving at a termination point, each of said termination points comprising an optical output, each of said optical networks being substantially the same length between its input and the optical output at each of said termination points; and
   (c) a plurality of integrated circuits each having a plurality of photodetectors that receive one of the optical outputs from the termination point of the optical waveguide segments of each of said plurality of optical networks, each of said plurality of integrated circuits being in synchronous communication with each of said plurality of sources of modulated electromagnetic energy at a high frequency data rate.

24. The system as recited in claim 23, wherein each of said plurality of sources of modulated electromagnetic energy comprises a laser that emits coherent single wavelength light.

25. The system as recited in claim 24, wherein each of said optical networks receives and guides single wavelength light.

26. The system as recited in claim 23, wherein said plurality of optical networks comprises an integrated multiple plane structure that contains said optical silicon-based waveguides.

27. The system as recited in claim 23, further comprising a plurality of sources of modulated electromagnetic energy and an optical multiplexer located at each said input to each of the plurality of optical networks, and an optical demultiplexer at each of the termination points of said plurality of segments of each of the plurality of optical networks.

28. The system as recited in claim 27, wherein each of said plurality of sources of modulated electromagnetic energy output single wavelength light of a different wavelength from one another and each of said optical networks receives and guides multiple wavelength light.

29. The system as recited in claim 28, wherein each of said optical demultiplexers outputs a plurality of single wavelength light signals that correspond in wavelength to the outputs of said plurality of sources of modulated electromagnetic energy.

30. The system as recited in claim 23, wherein said plurality of integrated circuits is in synchronous communication with said plurality of sources of modulated electromagnetic energy.

31. The system as recited in claim 27, wherein said plurality of integrated circuits is in synchronous communication with said plurality of sources of modulated electromagnetic energy.

32. The system as recited in claim 23, wherein said plurality of integrated circuits is in asynchronous communication with said plurality of sources of modulated electromagnetic energy.

33. The system as recited in claim 27, wherein said plurality of integrated circuits is in asynchronous communication with said plurality of sources of modulated electromagnetic energy.

* * * * *